United States Patent
Yoshinaga et al.

(10) Patent No.: US 8,867,145 B2
(45) Date of Patent: *Oct. 21, 2014

(54) ZOOM LENS SYSTEM, INTERCHANGEABLE LENS APPARATUS, AND CAMERA SYSTEM

(75) Inventors: Shunichiro Yoshinaga, Hyogo (JP); Isamu Izuhara, Osaka (JP); Nobuyuki Adachi, Tokyo (JP); Kyoichi Miyazaki, Osaka (JP)

(73) Assignee: Panasonic Corporation, Kadoma-shi (JP)

( * ) Notice: Subject to any disclaimer, the term of this patent is extended or adjusted under 35 U.S.C. 154(b) by 132 days.

This patent is subject to a terminal disclaimer.

(21) Appl. No.: 13/393,826

(22) PCT Filed: Feb. 1, 2011

(86) PCT No.: PCT/JP2011/000541
§ 371 (c)(1),
(2), (4) Date: Mar. 1, 2012

(87) PCT Pub. No.: WO2011/099249
PCT Pub. Date: Aug. 18, 2011

(65) Prior Publication Data
US 2012/0162482 A1 Jun. 28, 2012

(30) Foreign Application Priority Data
Feb. 10, 2010 (JP) ................. 2010-027814

(51) Int. Cl.
*G02B 15/14* (2006.01)
*G02B 27/64* (2006.01)
*G03B 17/14* (2006.01)
*G02B 13/18* (2006.01)
*G02B 15/173* (2006.01)

(52) U.S. Cl.
CPC .............. *G02B 15/173* (2013.01); *G03B 17/14* (2013.01); *G02B 27/646* (2013.01); *G02B 13/18* (2013.01); *G02B 15/14* (2013.01)

USPC ............ 359/688; 359/557; 359/676; 359/686

(58) Field of Classification Search
CPC ............ G02B 9/00; G02B 9/34; G02B 15/00; G02B 15/14; G02B 27/64; G02B 27/646
USPC .................. 359/557, 676, 686–688, 554, 715
See application file for complete search history.

(56) References Cited

U.S. PATENT DOCUMENTS 5,499,141 A * 3/1996 Ohtake ................ 359/684
5,502,594 A * 3/1996 Suzuki et al. ............ 359/557

(Continued)

FOREIGN PATENT DOCUMENTS

| JP | 58-140709 | * 8/1983 | ............ 359/688 |
|----|-----------|----------|---------------------|
| JP | H05-232410 A | 9/1993 | |
| JP | H08-184756 A | 7/1996 | |
| JP | H09-230241 A | 9/1997 | |
| JP | H11-109240 A | 4/1999 | |
| JP | 2000-221402 A | 8/2000 | |
| JP | 2004-341060 A | 12/2004 | |

(Continued)

*Primary Examiner* — Thong Nguyen
(74) *Attorney, Agent, or Firm* — James W. Judge

(57) ABSTRACT

A compact and lightweight zoom lens system having excellent imaging performance, which is favorably applicable to an interchangeable-lens type digital camera system, is provided. The zoom lens system of the present invention includes, in order from an object side to an image side, a first lens unit having positive optical power and composed of not more than two lens elements, a second lens unit having negative optical power, a third lens unit having negative optical power, and a fourth lens unit having positive optical power. In zooming from a wide-angle limit to a telephoto limit, the fourth lens unit moves along an optical axis. Further, the following conditions are satisfied: $1.50<nd_1<1.72$, $50<vd_1<75$ ($nd_1$: a refractive index to the d line of a positive lens element constituting the first lens unit, $vd_1$: an Abbe number of a positive lens element constituting the first lens unit).

13 Claims, 19 Drawing Sheets

(56) References Cited

U.S. PATENT DOCUMENTS

| | | | |
|---|---|---|---|
| 5,798,872 A * | 8/1998 | Uzawa | 359/686 |
| 7,221,517 B2 * | 5/2007 | Terada et al. | 359/682 |
| 7,221,518 B2 * | 5/2007 | Kim et al. | 359/687 |
| 2009/0295982 A1 * | 12/2009 | Eguchi | 348/347 |
| 2012/0154525 A1 * | 6/2012 | Yoshinaga et al. | 348/36 |

FOREIGN PATENT DOCUMENTS

| | | |
|---|---|---|
| JP | 2006-030582 A | 2/2006 |
| JP | 2008-033069 A | 2/2008 |

* cited by examiner

ZOOM LENS SYSTEM, INTERCHANGEABLE LENS APPARATUS, AND CAMERA SYSTEM

TECHNICAL FIELD

The present invention relates to a zoom lens system. More particularly, the present invention relates to a zoom lens system suitable for an imaging lens system of a so-called interchangeable-lens type digital camera system. Further, the present invention relates to an interchangeable lens apparatus and a camera system, each employing the zoom lens system.

BACKGROUND ART

In recent years, the market of interchangeable-lens type camera systems (also referred to simply as "camera systems", hereinafter) have been spreading rapidly. Such an interchangeable-lens type camera system includes: a camera body having an image sensor such as a CCD (Charge Coupled Device) or a CMOS (Complementary Metal-Oxide Semiconductor); and an interchangeable lens apparatus having a zoom lens system for forming an optical image on a light receiving surface of the image sensor. An image sensor included in the interchangeable-lens type camera system is larger in scale than that included in a compact digital camera. Accordingly, the interchangeable-lens type camera system can shoot a high-sensitivity and high-quality image. Further, the interchangeable-lens type camera system is advantageous in that a focusing operation and image processing after shooting can be performed at a high speed, and that an interchangeable lens apparatus can be easily replaced in accordance with a scene that a user desires to shoot. An interchangeable lens apparatus having a zoom lens system capable of forming an optical image with variable magnification is popular because such an interchangeable lens apparatus can freely vary the focal length without lens replacement.

CITATION LIST

Patent Literature

[PTL 1] Japanese Laid-Open Patent Publication No. 2006-30582
[PTL 2] Japanese Laid-Open Patent Publication No. 2004-341060
[PTL 3] Japanese Laid-Open Patent Publication No. 2000-221402
[PTL 4] Japanese Laid-Open Patent Publication No. 11-109240
[PTL 5] Japanese Laid-Open Patent Publication No. 8-184756

Problems to be Solved by the Invention

Although the interchangeable-lens type digital camera system has the above-described advantages, it is larger in size and weight than a compact digital camera. It is preferred that the size and weight of the interchangeable-lens type digital camera system be as small/light as possible in order to improve portability and handleability.

Accordingly, a zoom lens system for the interchangeable-lens type digital camera system is also required to be as compact and lightweight as possible while maintaining imaging performance.

SUMMARY OF THE INVENTION

Accordingly, an object of the present invention is to provide a compact and lightweight zoom lens system having excellent imaging performance, which is favorably applicable to an interchangeable-lens type digital camera system.

Another object of the present invention is to provide compact and lightweight interchangeable lens apparatus and camera system.

A zoom lens system according to the present invention includes: in order from an object side to an image side, a first lens unit having positive optical power and composed of not more than two lens elements; a second lens unit having negative optical power; a third lens unit having negative optical power; and a fourth lens unit having positive optical power. In zooming from a wide-angle limit to a telephoto limit, the fourth lens unit moves along an optical axis. Further, the following conditions are satisfied:

$$1.50 < nd_1 < 1.72 \tag{9}$$

$$50 < vd_1 < 75 \tag{10}$$

where
$nd_1$ is a refractive index to the d line of a positive lens element constituting the first lens unit, and
$vd_1$ is an Abbe number of a positive lens element constituting the first lens unit.

An interchangeable lens apparatus according to the present invention includes: the above-described zoom lens system; and a lens mount section which is connectable to a camera body including an image sensor for receiving an optical image formed by the zoom lens system and converting the optical image into an electric image signal.

A camera system according to the present invention includes: an interchangeable lens apparatus including the above-described zoom lens system; and a camera body which is detachably connected to the interchangeable lens apparatus via a camera mount section, and includes an image sensor for receiving an optical image formed by the zoom lens system and converting the optical image into an electric image signal.

According to the present invention, it is possible to realize a compact and lightweight zoom lens system having excellent imaging performance, and an interchangeable lens apparatus and a camera system, each having the zoom lens system.

DESCRIPTION OF EMBODIMENTS

Figure 1:
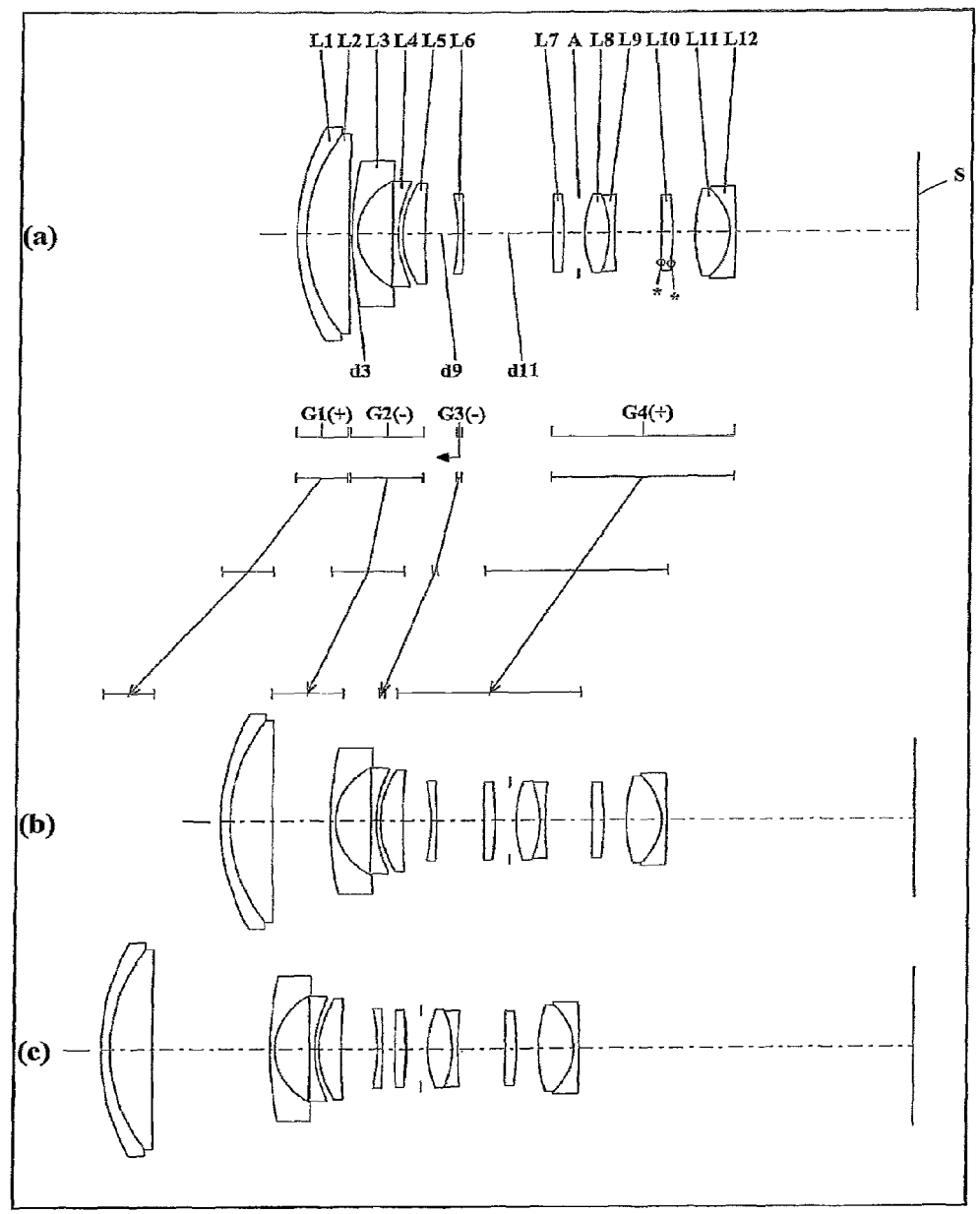
FIG. 1 is a lens arrangement diagram showing an infinity in-focus condition of a zoom lens system according to Embodiment 1 (Example 1).
Figure 2:
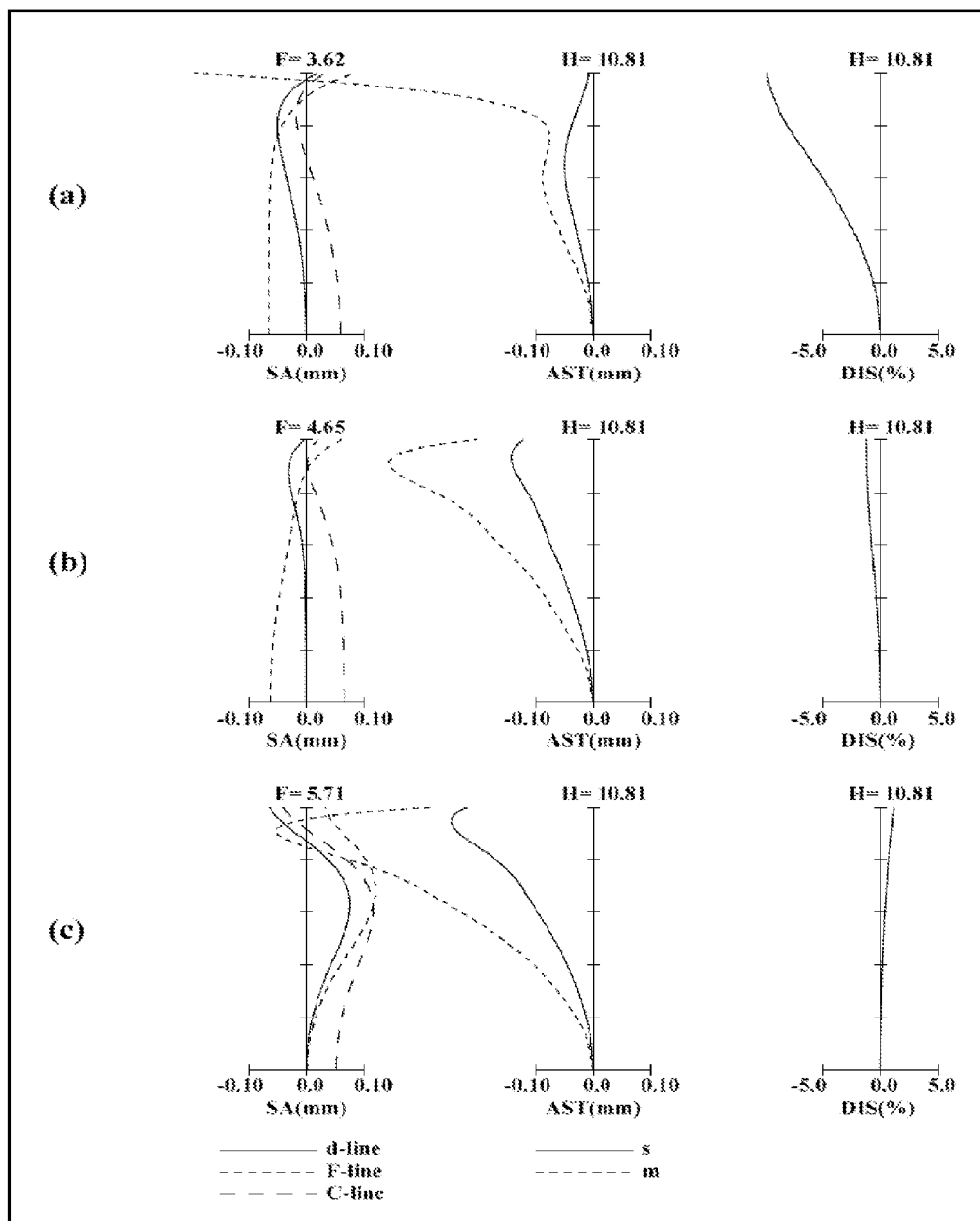
FIG. 2 is a longitudinal aberration diagram of the zoom lens system according to Example 1 in an infinity in-focus condition.
Figure 3:
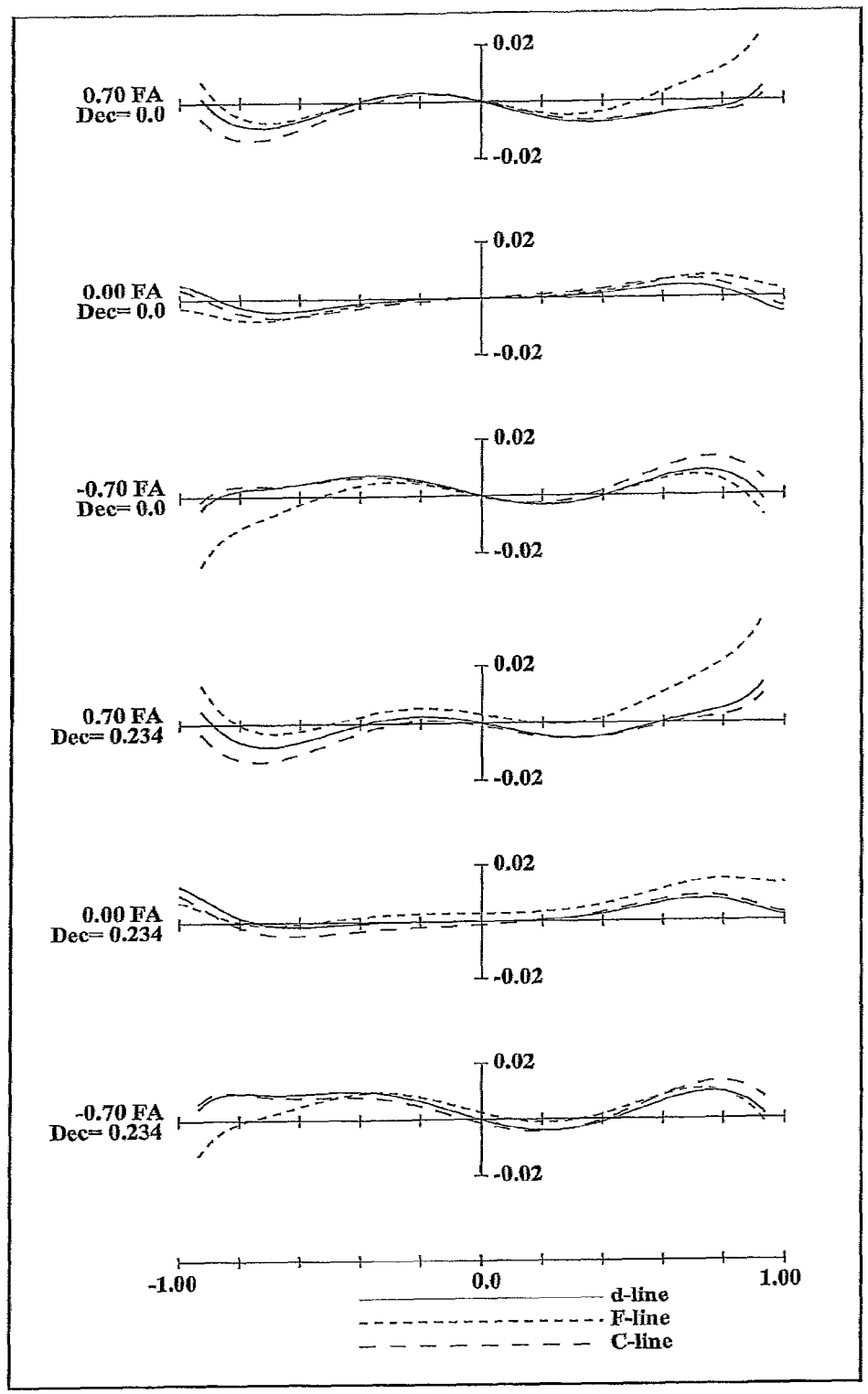
FIG. 3 is a lateral aberration diagram of the zoom lens system according to Example 1 at a telephoto limit in a basic state where image blur compensation is not performed and in an image blur compensation state.

FIGS. 1, 4, 7, 10, 13, and 16 are lens arrangement diagrams of zoom lens systems according to Embodiments 1, 2, 3, 4, 5, and 6, respectively. Each FIG. shows a zoom lens system in an infinity in-focus condition.

In each FIG., part (a) shows a lens configuration at a wide-angle limit (in the minimum focal length condition: focal length $f_W$), part (b) shows a lens configuration at a middle position (in an intermediate focal length condition: focal length $f_M = \sqrt{f_W * f_T}$), and part (c) shows a lens configuration at a telephoto limit (in the maximum focal length condition: focal length $f_T$). Further, in each FIG., each bent arrow located between part (a) and part (b) indicates a line obtained by connecting the positions of each lens unit respectively at a wide-angle limit, a middle position and a telephoto limit. In the part between the wide-angle limit and the middle position and the part between the middle position and the telephoto limit, the positions are connected simply with a straight line, and hence this line does not indicate actual motion of each lens unit. Further, in each FIG. an arrow imparted to a lens element indicates focusing from an infinity in-focus condition to a close-object in-focus condition. That is, the arrow indicates a moving direction during focusing from an infinity in-focus condition to a close-object in-focus condition.

In FIGS. 1, 4, 7, 10, 13, and 16, an asterisk "*" imparted to a particular surface indicates that the surface is aspheric. In each FIG., a sign (+) or (−) imparted to the symbol of each lens unit corresponds to the sign of the optical power of the lens unit. Further, in each FIG., a straight line located on the most right-hand side indicates the position of an image surface S. Further, in each FIG., an aperture diaphragm A is provided in a fourth lens unit G4.

Each of the zoom lens systems according to Embodiments 1 to 6 comprises, in order from the object side to the image side, a first lens unit G1 having positive optical power, a second lens unit G2 having negative optical power, a third lens unit G3 having negative optical power, and a fourth lens unit G4 having positive optical power.

(Embodiment 1)

The first lens unit G1 comprises, in order from the object side to the image side, a negative meniscus first lens element L1 with the convex surface facing the object side, and a positive meniscus second lens element L2 with the convex surface facing the object side. The first lens element L1 and the second lens element L2 are cemented with each other.

The second lens unit G2 comprises, in order from the object side to the image side, a negative meniscus third lens element L3 with the convex surface facing the object side, a bi-concave fourth lens element L4, and a positive meniscus fifth lens element L5 with the convex surface facing the object side.

The third lens unit G3 comprises a negative meniscus sixth lens element L6 with the convex surface facing the image side.

The fourth lens unit G4 comprises, in order from the object side to the image side, a bi-convex seventh lens element L7, a bi-convex eighth lens element L8, a bi-concave ninth lens element L9, a positive meniscus tenth lens element L10 with the convex surface facing the image side, a bi-convex eleventh lens element L11, and a negative meniscus twelfth lens element L12 with the convex surface facing the image side. The eighth lens element L8 and the ninth lens element L9 are cemented with each other, and the eleventh lens element L11 and the twelfth lens element L12 are cemented with each other. The both surfaces of the tenth lens element L10 are aspheric. The tenth lens element L10 is formed of a resin.

(Embodiment 2)

The first lens unit G1 comprises, in order from the object side to the image side, a negative meniscus first lens element L1 with the convex surface facing the object side, and a bi-convex second lens element. The first lens element L1 and the second lens element L2 are cemented with each other.

The second lens unit G2 comprises, in order from the object side to the image side, a negative meniscus third lens element L3 with the convex surface facing the object side, a bi-concave fourth lens element L4, and a bi-convex fifth lens element L5.

The third lens unit G3 comprises a negative meniscus sixth lens element L6 with the convex surface facing the image side.

The fourth lens unit G4 comprises, in order from the object side to the image side, a bi-convex seventh lens element L7, a bi-convex eighth lens element L8, a bi-concave ninth lens element L9, a negative meniscus tenth lens element L10 with the convex surface facing the object side, a bi-convex eleventh lens element L11, and a negative meniscus twelfth lens element L12 with the convex surface facing the image side. The eighth lens element L8 and the ninth lens element L9 are cemented with each other, and the tenth lens element L10 and the eleventh lens element L11 are cemented with each other. The both surfaces of the twelfth lens element L12 are aspheric. The twelfth lens element L12 is formed of a resin.

(Embodiment 3)

The first lens unit G1 comprises, in order from the object side to the image side, a negative meniscus first lens element L1 with the convex surface facing the object side, and a bi-convex second lens element L2.

The second lens unit G2 comprises, in order from the object side to the image side, a negative meniscus third lens element L3 with the convex surface facing the object side, a bi-concave fourth lens element L4, and a bi-convex fifth lens element L5.

The third lens unit G3 comprises a negative meniscus sixth lens element L6 with the convex surface facing the image side. The sixth lens element L6 has an aspheric object side surface.

The fourth lens unit G4 comprises, in order from the object side to the image side, a bi-convex seventh lens element L7, a bi-convex eighth lens element L8, a bi-concave ninth lens element L9, a positive meniscus tenth lens element L10 with the convex surface facing the object side, a bi-convex eleventh lens element L11, and a negative meniscus twelfth lens element L12 with the convex surface facing the image side. The eighth lens element L8 and the ninth lens element L9 are cemented with each other. The both surfaces of the tenth lens element L10 are aspheric. The tenth lens element L10 is formed of a resin.

(Embodiment 4)

The first lens unit G1 comprises, in order from the object side to the image side, a negative meniscus first lens element L1 with the convex surface facing the object side, and a positive meniscus second lens element L2 with the convex surface facing the object side.

The second lens unit G2 comprises, in order from the object side to the image side, a negative meniscus third lens element L3 with the convex surface facing the object side, a bi-concave fourth lens element L4, and a bi-convex fifth lens element L5.

The third lens unit G3 comprises a negative meniscus sixth lens element L6 with the convex surface facing the image side.

The fourth lens unit G4 comprises, in order from the object side to the image side, a bi-convex seventh lens element L7, a bi-convex eighth lens element L8, a negative meniscus ninth lens element L9 with the convex surface facing the image side, a bi-convex tenth lens element L10, a bi-convex eleventh lens element L11, and a negative meniscus twelfth lens element L12 with the convex surface facing the image side. The eighth lens element L8 and the ninth lens element L9 are cemented with each other. The object-side surface of the seventh lens element L7 and the both surfaces of the tenth lens element L10 are aspheric. The seventh lens element L7 and the tenth lens element L10 are formed of a resin.

(Embodiment 5)

The first lens unit G1 comprises, in order from the object side to the image side, a negative meniscus first lens element L1 with the convex surface facing the object side, and a positive meniscus second lens element L2 with the convex surface facing the object side. The first lens element L1 and the second lens element L2 are cemented with each other.

The second lens unit G2 comprises, in order from the object side to the image side, a negative meniscus third lens element L3 with the convex surface facing the object side, a bi-concave fourth lens element L4, and a bi-convex fifth lens element L5.

The third lens unit G3 comprises a bi-concave sixth lens element L6.

The fourth lens unit G4 comprises, in order from the object side to the image side, a bi-convex seventh lens element L7, a bi-convex eighth lens element L8, a bi-concave ninth lens element L9, a positive meniscus tenth lens element L10 with the convex surface facing the object side, a bi-convex eleventh lens element L11, and a negative meniscus twelfth lens element L12 with the convex surface facing the image side. The eighth lens element L8 and the ninth lens element L9 are cemented with each other, and the eleventh lens element L11 and the twelfth lens element L12 are cemented with each other. The both surfaces of the tenth lens element L10 are aspheric. The tenth lens element L10 is formed of a resin. A vertical line between the ninth lens element L9 and the tenth lens element L10 indicates a flare-cut diaphragm.

(Embodiment 6)

The first lens unit G1 comprises, in order from the object side to the image side, a negative meniscus first lens element L1 with the convex surface facing the object side, and a bi-convex second lens element L2.

The second lens unit G2 comprises, in order from the object side to the image side, a negative meniscus third lens element L3 with the convex surface facing the object side, a bi-concave fourth lens element L4, and a positive meniscus fifth lens element L5 with the convex surface facing the object side.

The third lens unit G3 comprises a negative meniscus sixth lens element L6 with the convex surface facing the image side.

The fourth lens unit G4 comprises, in order from the object side to the image side, a bi-convex seventh lens element L7, a bi-convex eighth lens element L8, a bi-concave ninth lens element L9, a bi-convex tenth lens element L10, a bi-convex eleventh lens element L11, and a negative meniscus twelfth lens element L12 with the convex surface facing the image side. The eighth lens element L8 and the ninth lens element L9 are cemented with each other. The both surfaces of the tenth lens element L10 are aspheric. The tenth lens element L10 is formed of a resin.

In Embodiments 1 to 4 and 6, in zooming from a wide-angle limit to a telephoto limit, the respective lens units move along the optical axis to the object side so that the interval between the first lens unit G1 and the second lens unit G2 becomes longer at the telephoto-limit than at the wide-angle limit, the interval between the second lens unit G2 and the third lens unit G3 becomes longer at the telephoto-limit than at the wide-angle limit, and the interval between the third lens unit G3 and the fourth lens unit G4 becomes shorter at the telephoto-limit than at the wide-angle limit. An aperture diaphragm A moves along the optical axis together with the fourth lens unit G4. Further, in zooming from a wide-angle limit to a telephoto limit, the interval between the first lens unit G1 and the second lens unit G2 monotonically increases, the interval between the second lens unit G2 and the third lens unit G3 decreases and then increases, and the interval between the third lens unit G3 and the fourth lens unit G4 monotonically decreases.

In Embodiment 5, in zooming from a wide-angle limit to a telephoto limit, the respective lens units move along the optical axis to the object side so that the interval between the first lens unit G1 and the second lens unit G2 becomes longer at the telephoto-limit than at the wide-angle limit, the interval between the second lens unit G2 and the third lens unit G3 becomes longer at the telephoto-limit than at the wide-angle limit, and the interval between the third lens unit G3 and the fourth lens unit G4 becomes shorter at the telephoto limit than at the wide-angle limit. An aperture diaphragm A moves along the optical axis together with the fourth lens unit G4. Further, in zooming from a wide-angle limit to a telephoto limit, the interval between the first lens unit G1 and the second lens unit G2 monotonically increases, the interval between the second lens unit G2 and the third lens unit G3 monotonically increases, and the interval between the third lens unit G3 and the fourth lens unit G4 monotonically decreases.

As in the zoom lens systems according to the respective embodiments, it is preferred that, in zooming, the first lens unit G1 moves along the optical axis. By using the first lens unit as a variable magnification unit, the light beam height in the first lens unit G1 can be reduced. As a result, size reduction of the first lens unit G1 is realized. Further, it is preferred that, in zooming, the fourth lens unit G4 moves along the optical axis. By using the fourth lens unit G4 as a variable magnification unit, imaging performance of the zoom lens system is improved while achieving size reduction when the zoom lens system is shrunk.

In the zoom lens systems according to the respective embodiments, in focusing from an infinity in-focus condition to a close-object in-focus condition, the third lens unit G3 moves along the optical axis to the object side. In the case where the third lens unit G3 is given a function as a focusing lens unit and, further, the third lens unit is composed of a single lens element, the weight of the focusing lens unit can be reduced. In this configuration, high-speed focusing is realized.

In the zoom lens systems according to the respective embodiments, the fourth lens unit G4 comprises, in order from the object side to the image side, a first sub-lens unit and a second sub-lens unit. When a single lens unit is composed of a plurality of lens elements, a sub-lens unit corresponds to any one lens element or a combination of a plurality of adjacent lens elements, which is/are included in the lens unit. In Embodiments 1, 2, 4 to 6, 8, and 9, the seventh lens element L7 constitutes the first sub-lens unit, and the eighth to twelfth lens elements L8 to L12 constitute the second sub-lens unit. In Embodiments 3 and 7, the sixth lens element L6 constitutes the first sub-lens unit, and the seventh to eleventh lens elements L7 to L11 constitute the second sub-lens unit.

In the zoom lens systems according to the respective embodiments, when compensating image blur caused by vibration applied to the zoom lens system, the first sub-lens unit in the fourth lens unit G4 moves in a direction perpendicular to the optical axis to compensate movement of an image point caused by vibration of the entire system.

In this way, when an image blur compensation lens unit is composed of only a part of lens elements constituting the fourth lens unit, weight reduction of the image blur compensation lens unit is achieved. Accordingly, the image blur compensation lens unit can be driven by a simple driving mechanism. Particularly when the image blur compensation lens unit is composed of only a single lens element, the driving mechanism for the image blur compensation lens unit can be more simplified.

It is preferred that the first lens unit be composed of a single or two lens elements. An increase in the number of lens elements constituting the first lens unit causes an increase in the diameter of the first lens unit. When the first lens unit is composed of two lens elements, both the configuration length and the diameter of the first lens unit can be reduced, which is advantageous to size reduction of the entire system. Further, when the number of required lens elements is reduced, cost reduction is also achieved.

It is preferred that the first lens unit be composed of only a cemented lens. In this case, chromatic aberration at a telephoto limit can be favorably compensated.

It is preferred that a resin lens element be included in the fourth lens unit. When at least one lens element constituting the fourth lens unit is formed of a resin, production cost of the zoom lens system can be reduced.

Further, it is preferred that the focusing lens unit, the image blur compensation sub-lens unit, and the aperture diaphragm be arranged adjacent to each other. In this case, since the driving mechanism including an actuator is simplified, size reduction of the interchangeable lens apparatus is achieved. Particularly when the aperture diaphragm is arranged closest to the image side, the driving mechanism can be more simplified.

The following will describe numerical conditions to be satisfied by a zoom lens system according to any of the respective embodiments. A zoom lens system according to any of the respective embodiments is desired to satisfy as many conditions described below as possible However, when an individual condition is satisfied, a zoom lens system having the corresponding effect is obtained.

A zoom lens system according to any of the respective embodiments preferably satisfies the following condition (1).

$$1.0 < T_4/f_W < 3.5 \tag{1}$$

where $T_4$ is a thickness (mm) of the fourth lens unit in the optical axis direction, and $f_W$ is a focal length (mm) of the entire system at a wide-angle limit.

The condition (1) sets forth the configuration length of the fourth lens unit in the optical axis direction. When condition (1) is satisfied, size reduction of the zoom lens system and successful compensation for various aberrations such as field curvature can be achieved. If the value exceeds the upper limit of the condition (1), the configuration length of the entire zoom lens system increases, resulting in a disadvantage to size reduction of the zoom lens system. On the other hand, if the value goes below the lower limit of the condition (1), it becomes difficult to compensate the field curvature.

When a zoom lens system according to any of the respective embodiments satisfies at least one of the following conditions (1') and (1") in addition to the condition (1), the above-mentioned advantageous effect is achieved more successfully.

$$1.4 < T_4/f_W \tag{1'}$$

$$T_4/f_W < 2.0 \tag{1''}$$

A zoom lens system according to any of the respective embodiments preferably satisfies the following condition (2).

$$0.71 < |D_{4WT}/f_W| < 2.5 \tag{2}$$

where $D_{4WT}$ is an amount of movement (mm) of the fourth lens unit in zooming from a wide-angle limit to a telephoto limit, and $f_W$ is a focal length (mm) of the entire system at a wide-angle limit.

The condition (2) sets forth an amount of movement of the fourth lens unit in zooming. When the condition (2) is satisfied, size reduction of the zoom lens system and successful aberration compensation are achieved. If the value exceeds the upper limit of the condition (2), the amount of movement of the fourth lens unit at the time of magnification is increased, which makes it difficult to achieve size reduction. On the other hand, if the value goes below the lower limit of the condition (2), contribution of the fourth lens unit to magnification becomes too small, which makes it difficult to achieve aberration compensation.

When a zoom lens system according to any of the respective embodiments satisfies at least one of the following conditions (2') and (2") in addition to the condition (2), the above-mentioned advantageous effect is achieved more successfully.

$$1.1 < |D_{4WT}/f_W| \quad (2')$$

$$|D_{4WT}/f_W| < 1.9 \quad (2'')$$

A zoom lens system according to any of the respective embodiments preferably satisfies the following condition (3).

$$0.2 < |f_W/f_F| < 0.6 \quad (3)$$

where $f_W$ is a focal length (mm) of the entire system at a wide-angle limit, and $f_F$ is a focal length (mm) of the focusing lens unit.

The condition (3) sets forth a focal length of the focusing lens unit. When the condition (3) is satisfied, suppression of aberration fluctuation in zooming and high-speed focusing are achieved. If the value exceeds the upper limit of the condition (3), aberration fluctuation between an infinity in-focus condition and a close-object in-focus condition, particularly fluctuation of field curvature, becomes considerable, which leads to deterioration of image quality. On the other hand, if the value goes below the lower limit of the condition (3), the amount of focus movement increases, which makes it difficult to realize high-speed focusing.

When a zoom lens system according to any of the respective embodiments satisfies at least one of the following conditions (3') and (3") in addition to the condition (3), the above-mentioned advantageous effect is achieved more successfully.

$$0.25 < |f_W/f_F| \quad (3')$$

$$|f_W/f_F| < 0.5 \quad (3'')$$

A zoom lens system according to each embodiment preferably satisfies the following condition (4).

$$0.77 < |D_1/f_W| < 3.5 \quad (4)$$

where $D_1$ is an amount of movement (mm) of the first lens unit in zooming from a wide-angle limit to a telephoto limit, and $f_W$ is a focal length (mm) of the entire system at a wide-angle limit.

The condition (4) sets forth an amount of movement of the first lens unit. When the condition (4) is satisfied, size reduction of the zoom lens system and successful compensation for various aberrations including field curvature are achieved. When the value exceeds the upper limit of the condition (4), the cam increases in size, which makes it difficult to achieve size reduction of the zoom lens system when it is shrunk. On the other hand, when the value goes below the lower limit of the condition (4), it becomes difficult to compensate various aberration, particularly field curvature at a telephoto limit.

When a zoom lens system according to any of the respective embodiments satisfies at least one of the following conditions (4') and (4") in addition to the condition (4), the above-mentioned advantageous effect is achieved more successfully.

$$1.7 < |D_1/f_W| \quad (4')$$

$$|D_1/f_W| < 2.3 \quad (4'')$$

A zoom lens system according to any of the respective embodiments preferably satisfies the following condition (5).

$$0.3 < (D_{3WT} - D_{4WT})/f_W < 1.5 \quad (5)$$

where $D_{3WT}$ is an amount of movement (mm) of the third lens unit in zooming from a wide-angle limit to a telephoto limit, $D_{4WT}$ is an amount of movement (mm) of the fourth lens unit in zooming from a wide-angle limit to a telephoto limit, and $f_W$ is a focal length (mm) of the entire system at a wide-angle limit.

The condition (5) sets forth the interval between the third lens unit and the fourth lens unit in zooming from a wide-angle limit to a telephoto limit. When the condition (5) is satisfied, size reduction of the zoom lens system is achieved while maintaining a magnification ratio. If the value exceeds the upper limit of the condition (5), it becomes difficult to achieve size reduction of the zoom lens system. On the other hand, if the value goes below the lower limit of the condition (5), it becomes difficult to ensure a magnification ratio.

When a zoom lens system according to any of the respective embodiments satisfies at least one of the following conditions (5') and (5") in addition to the condition (5), the above-mentioned advantageous effect is achieved more successfully.

$$0.6 < (D_{3WT} - D_{4WT})/f_W \quad (5')$$

$$(D_{3WT} - D_{4WT})/f_W < 1.1 \quad (5'')$$

A zoom lens system according to any of the respective embodiments preferably satisfies the following condition (6).

$$0.1 < (D_{3WM} - D_{4WM})/f_W < 1.0 \quad (6)$$

where $D_{3WM}$ is an amount of movement (mm) of the third lens unit in zooming from a wide-angle limit to a middle position, $D_{4WM}$ is an amount of movement (mm) of the fourth lens unit in zooming from a wide-angle limit to a middle position, and $f_W$ is a focal length (mm) of the entire system at a wide-angle limit.

The condition (6) sets forth an interval between the third lens unit and the fourth lens unit in zooming from a wide-angle unit to a middle position. When the condition (6) is satisfied, size reduction of the zoom lens system is achieved while maintaining a magnification ratio. If the value exceeds the upper limit of the condition (6), it becomes difficult to achieve size reduction of the zoom lens system. On the other hand, if the value goes below the lower limit of the condition (6), it becomes difficult to ensure a magnification ratio.

When a zoom lens system according to any of the respective embodiments satisfies at least one of the following conditions (6') and (6") in addition to the condition (6), the above-mentioned advantageous effect is achieved more successfully.

$$0.3 < (D_{3WM} - D_{4WM})/f_W \quad (6')$$

$$(D_{3WM} - D_{4WM})/f_W < 0.7 \quad (6'')$$

A zoom lens system according to any of the respective embodiments preferably satisfies the following condition (7).

$$|f_W/f_P| < 0.35 \quad (7)$$

where $f_W$ is a focal length (mm) of the entire system at a wide-angle limit, and $f_P$ is a focal length (mm) of a resin lens included in the fourth lens unit.

The condition (7) sets forth a focal length of a resin lens included in the fourth lens unit. When the condition (7) is satisfied, image quality can be maintained even when the refractive index of the resin lens varies due to variation in the environmental temperature. If the value is outside the numerical value range of the condition (7), the field curvature increases when the refractive index of the resin lens varies due to variation in the environmental temperature, leading to deterioration of the image quality.

When a zoom lens system according to any of the respective embodiments satisfies the following condition (7') in addition to the condition (7), the above-mentioned advantageous effect is achieved more successfully.

$$|f_W/f_P|<0.21 \tag{7'}$$

A zoom lens system according to any of the respective embodiments preferably satisfies the following condition (8).

$$0.7<BF_W/f_W<3.0 \tag{8}$$

where $BF_W$ is a back focus (mm) of the entire system at a wide-angle limit, and $f_W$ is a focal length (mm) of the entire system at a wide-angle limit.

The condition (8) sets forth a back focus of the entire system at a wide-angle limit. When the condition (8) is satisfied, size reduction of the zoom lens system is achieved while avoiding deterioration of image quality at a peripheral part of an imaging region. If the value exceeds the upper limit of the condition (8), it becomes difficult to achieve size reduction of the zoom lens system. On the other hand, if the value goes below the lower limit of the condition (8), the incident angle of light beam on the image sensor increases, which makes it difficult to ensure illuminance at the peripheral part of the imaging region.

When a zoom lens system according to any of the respective embodiments satisfies at least one of the following conditions (8') and (8") in addition to the condition (8), the above-mentioned advantageous effect is achieved more successfully.

$$1.1<BF_W/f_W \tag{8'}$$

$$BF_W/f_W<1.8 \tag{8"}$$

A zoom lens system according to any of the respective embodiments preferably satisfies the following condition (9).

$$1.50<nd_1<1.72 \tag{9}$$

where $nd_1$ is a refractive index to the d line of a positive lens element constituting the first lens unit.

The condition (9) sets forth a refractive index to the d line of a positive lens element constituting the first lens unit. When the condition (9) is satisfied, size reduction of the zoom lens system is achieved at low cost. If the value exceeds the upper limit of the condition (9), it becomes difficult to achieve cost reduction. On the other hand, if the value goes below the lower limit of the condition (9), the core thickness of the positive lens element constituting the first lens unit increases, resulting in a disadvantage to size reduction of the zoom lens system.

When a zoom lens system according to any of the respective embodiments satisfies at least one of the following conditions (9') and (9") in addition to the condition (9), the above-mentioned advantageous effect is achieved more successfully.

$$1.55<nd_1 \tag{9'}$$

$$nd_1<1.65 \tag{9"}$$

A zoom lens system according to any of the respective embodiments preferably satisfies the following condition (10).

$$50<vd_1<75 \tag{10}$$

where $vd_1$ is an Abbe number of a positive lens element constituting the first lens unit.

The condition (10) sets forth an Abbe number of a positive lens element constituting the first lens unit. When the condition (10) is satisfied, a zoom lens system having excellent image quality is realized at low cost. If the value exceeds the upper limit of the condition (10), it becomes difficult to achieve cost reduction. On the other hand, if the value goes below the lower limit of the condition (10), it becomes difficult to compensate chromatic aberration at a telephoto limit.

When a zoom lens system according to any of the respective embodiments satisfies at least one of the following conditions (10') and (10") in addition to the condition (10), the above-mentioned advantageous effect is achieved more successfully.

$$55<vd_1 \tag{10'}$$

$$vd_1<60 \tag{10"}$$

Each of the lens units of the zoom lens systems according to the respective embodiments may be constituted exclusively of refractive type lens elements that deflect incident light by refraction (that is, lens elements of a type in which deflection is achieved at the interface between media having different refractive indices). Alternatively, each lens unit may be composed of any one of, or a combination of, diffractive type lens elements that deflect incident light by diffraction; refractive-diffractive hybrid type lens elements that deflect incident light by a combination of diffraction and refraction; and gradient index type lens elements that deflect incident light by distribution of refractive index in the medium.

(Embodiment 7)

Figure 19:
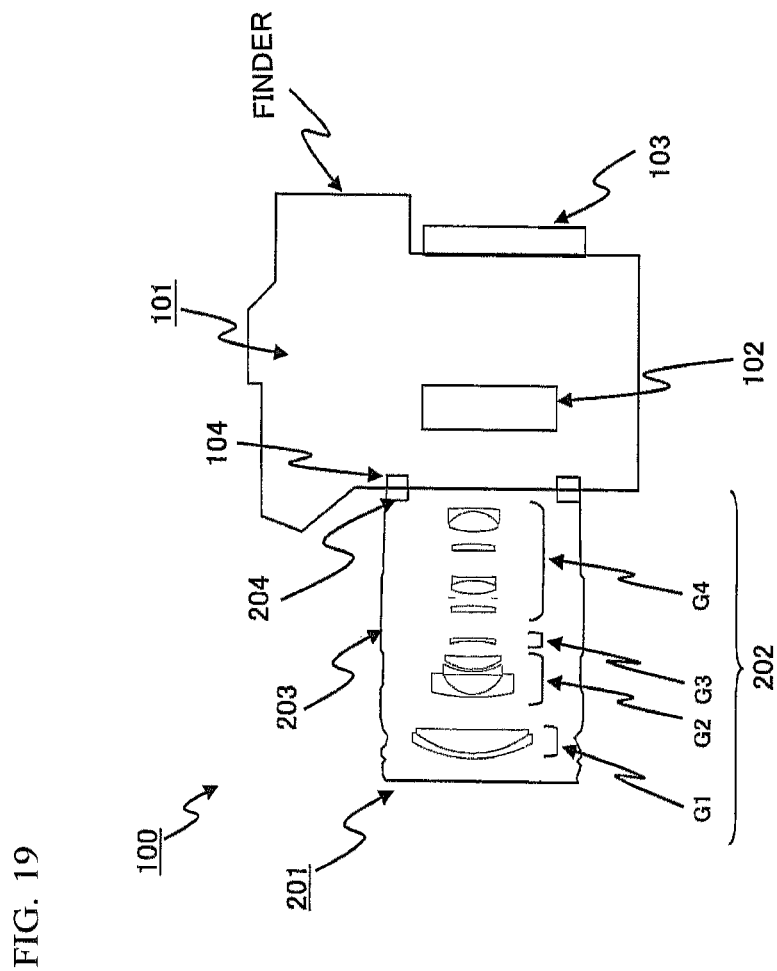
FIG. 19 is a schematic construction diagram of a camera system according to Embodiment 7.

FIG. 19 is a schematic block diagram of an interchangeable-lens type digital camera system according to Embodiment 7.

The interchangeable-lens type digital camera system (hereinafter, referred to simply as "camera system") 100 according to the present embodiment includes a camera body 101, and an interchangeable lens apparatus 201 which is detachably connected to the camera body 101.

The camera body 101 includes: an image sensor 102 which receives an optical image formed by a zoom lens system 202 of the interchangeable lens apparatus 201, and converts the optical image into an electric image signal; a liquid crystal monitor 103 which displays the image signal obtained by the image sensor 102; and a camera mount 104. On the other hand, the interchangeable lens apparatus 201 includes: a zoom lens system 202 according to any of Embodiments 1 to 6; a lens barrel 203 which holds the zoom lens system 202; and a lens mount 204 connected to the camera mount 104 of the camera body 101. The camera mount 104 and the lens mount 204 are physically connected to each other. Moreover, the camera mount 104 and the lens mount 204 function as interfaces which allow the camera body 101 and the interchangeable lens apparatus 201 to exchange signals, by electrically connecting a controller (not shown) in the camera body 101 and a controller (not shown) in the interchangeable lens apparatus 201.

In the present embodiment, the zoom lens system 202 according to any of Embodiments 1 to 6 is employed. Accordingly, a compact interchangeable lens apparatus having excellent imaging performance can be realized at low cost. Moreover, size reduction and cost reduction of the entire camera system 100 according to the present embodiment can be achieved.

EXAMPLES

Hereinafter, numerical examples are described below in which the zoom lens systems according to the above-described embodiments are implemented. As described later, Numerical Examples 1, 2, 3, 4, 5, and 6 correspond to Embodiments 1, 2, 3, 4, 5, and 6, respectively. In each numerical example, the units of length are all "mm", and the units of view angle are all "°". In each numerical example, r is the radius of curvature, d is the axial distance, nd is the refractive index to the d-line, and vd is the Abbe number to the d-line. Further, in each numerical example, the surfaces marked with * are aspheric surfaces, and the aspheric surface configuration is defined by the following expression.

$$Z = \frac{h^2/r}{1 + \sqrt{1 - (1+\kappa)(h/r)^2}} + \sum A_n h^n \quad \text{[Math. 1]}$$

where

Z is a distance from an on-aspheric-surface point at a height of h relative to the optical axis, to a tangential plane at the top of the aspheric surface, h is a height relative to the optical axis, r is a radius of curvature at the top, κ is a conic constant, and $A_n$ is an n-th order aspheric coefficient.

FIGS. 2, 5, 8, 11, 14, and 17 are longitudinal aberration diagrams of the zoom lens systems according to Numerical Examples 1, 2, 3, 4, 5, and 6 in their infinity in-focus conditions, respectively.

In each longitudinal aberration diagram, part (a), part (b), and part (c) show aberrations at a wide-angle limit, at a middle position, and at a telephoto limit, respectively. Each longitudinal aberration diagram shows, in order from the left-hand side, a spherical aberration (SA (mm)), an astigmatism (AST (mm)), and a distortion (DIS (%)). In each spherical aberration diagram, a vertical axis indicates an F-number (in each FIG., indicated as F), and a solid line, a short dash line, and a long dash line indicate the characteristics to the d-line, the F-line, and the C-line, respectively. In each astigmatism diagram, a vertical axis indicates an image height (in each FIG., indicated as H), and a solid line and a dash line indicate the characteristics to the sagittal plane (in each FIG., indicated as "s") and the meridional plane (in each FIG., indicated as "m"), respectively. In each distortion diagram, a vertical axis indicates an image height (in each FIG., indicated as H).

FIGS. 3, 6, 9, 12, 15, and 18 are lateral aberration diagrams of the zoom lens systems according to Numerical Examples 1, 2, 3, 4, 5, and 6 in a basic state where image blur compensation is not performed and in an image blur compensation state, respectively.

In each lateral aberration diagram, the aberration diagrams in the upper three parts correspond to a basic state at a telephoto limit, where image blur compensation is not performed at a telephoto limit, and the aberration diagrams in the lower three parts correspond to an image blur compensation state at a telephoto limit, where the image blur compensation sub-lens unit (the first sub-lens unit) included in the fourth lens unit G4 is moved by a predetermined amount in a direction perpendicular to the optical axis. Among the lateral aberration diagrams in the basic state, the upper part shows a lateral aberration at an image point of 70% of the maximum image height, the middle part shows a lateral aberration at an axial image point, and the lower part shows a lateral aberration at an image point of −70% of the maximum image height. Among the lateral aberration diagrams in the image blur compensation state, the upper part shows a lateral aberration at an image point of 70% of the maximum image height, the middle part shows a lateral aberration at an axial image point, and the lower part shows a lateral aberration at an image point of −70% of the maximum image height. In each lateral aberration diagram, a horizontal axis indicates the distance from a principal beam on a pupil surface, and a solid line, a short dash line, and a long dash line indicate the characteristics to the d-line, the F-line and the C-line, respectively. In each lateral aberration diagram, the meridional plane is adopted as a plane containing the optical axis of the first lens unit G1.

Table 1 shows an amount of movement ($Y_T$ (mm)), at a telephoto limit, of the image blur compensation sub-lens unit in the direction perpendicular to the optical axis, in the image blur compensation state of the zoom lens system according to each numerical example. The image blur compensation angle is 0.3°. That is, the amount of movement of the image blur compensation sub-lens unit shown below is equal to an amount of image decentering in a case where the optical axis of the zoom lens system inclines at 0.3°.

TABLE 1

(amount of movement of image blur compensation sub-lens unit)

| Example | Amount of Movement $Y_T$(mm) |
|---|---|
| 1 | 0.234 |
| 2 | 0.275 |
| 3 | 0.255 |
| 4 | 0.352 |
| 5 | 0.208 |
| 6 | 0.261 |

Numerical Example 1

The zoom lens system of Numerical Example 1 corresponds to Embodiment 1 (FIG. 1). The surface data, the aspheric surface data, the various data, the lens element data, the zoom lens unit data, and the zoom lens unit magnification are shown in Tables 2, 3, 4, 5, 6, and 7, respectively.

TABLE 2

(Surface data)

| Surface number | r | d | nd | vd |
|---|---|---|---|---|
| Object surface | ∞ | | | |
| 1 | 33.08030 | 1.20000 | 1.84666 | 23.8 |
| 2 | 24.35990 | 5.63190 | 1.58913 | 61.3 |
| 3 | 600.00000 | Variable | | |
| 4 | 48.85560 | 0.70000 | 1.77250 | 49.6 |
| 5 | 8.67050 | 4.65400 | | |
| 6 | −284.56240 | 0.70000 | 1.80420 | 46.5 |
| 7 | 17.22950 | 0.53940 | | |
| 8 | 14.00870 | 2.96900 | 1.84666 | 23.8 |
| 9 | 124.03830 | Variable | | |
| 10 | −28.80590 | 0.70000 | 1.77250 | 49.6 |
| 11 | −96.36410 | Variable | | |
| 12 | 320.76140 | 1.47460 | 1.69680 | 55.5 |
| 13 | −49.62440 | 1.95000 | | |
| 14(Aperture) | ∞ | 0.90000 | | |

TABLE 2-continued (Surface data)

| Surface number | r | d | nd | vd |
|---|---|---|---|---|
| 15 | 16.64810 | 3.20120 | 1.69680 | 55.5 |
| 16 | −14.47520 | 0.70000 | 1.80610 | 33.3 |
| 17 | 80.18650 | 6.24320 | | |
| 18* | −81.87490 | 1.50000 | 1.54360 | 56.0 |
| 19* | −32.88020 | 2.94230 | | |
| 20 | 21.60610 | 4.69330 | 1.51680 | 64.2 |
| 21 | −8.33000 | 0.70000 | 1.71300 | 53.9 |
| 22 | −132.10180 | BF | | |
| Image surface | ∞ | | | |

TABLE 3

(Aspheric surface data)

| Surface No. | Parameters |
|---|---|
| 18 | K = 0.00000E+00, A4 = 1.33886E−04, A6 = 3.24570E−06, A8 = −7.64286E−08 |
| 19 | K = 0.00000E+00, A4 = 1.15737E−04, A6 = 3.02082E−06, A8 = −8.18542E−08 |

TABLE 4

(Various data)
Zooming ratio 2.81403

| | Wide | Middle | Telephoto |
|---|---|---|---|
| Focal length | 14.4006 | 24.1581 | 40.5238 |
| F-number | 3.62154 | 4.64730 | 5.71166 |
| View angle | 39.8141 | 24.3766 | 14.7748 |
| Image height | 10.8150 | 10.8150 | 10.8150 |
| Overall length of lens system | 82.0609 | 91.7923 | 107.6421 |
| BF | 24.09844 | 32.83383 | 44.27395 |
| d3 | 0.4000 | 7.7101 | 15.6769 |
| d9 | 4.2923 | 3.6969 | 4.6923 |
| d11 | 11.8713 | 6.1526 | 1.6000 |
| Entrance pupil position | 17.6966 | 29.5670 | 47.5893 |
| Exit pupil position | −17.8621 | −17.8621 | −17.8621 |
| Front principal point position | 27.1550 | 42.2130 | 61.6843 |
| Back principal point position | 67.6603 | 67.6342 | 67.1183 |

TABLE 5

(Lens element data)

| Unit | Initial surface No. | Focal length |
|---|---|---|
| 1 | 1 | −116.4931 |
| 2 | 2 | 42.9431 |
| 3 | 4 | −13.7501 |
| 4 | 6 | −20.1804 |
| 5 | 8 | 18.4244 |
| 6 | 10 | −53.4301 |
| 7 | 12 | 61.7766 |
| 8 | 15 | 11.6021 |
| 9 | 16 | −15.1611 |
| 10 | 18 | 99.9998 |
| 11 | 20 | 12.2898 |
| 12 | 21 | −12.4987 |

TABLE 6

(Zoom lens unit data)

| Unit | Initial surface No. | Focal length | Length of lens unit | Front principal point position | Back principal point position |
|---|---|---|---|---|---|
| 1 | 1 | 70.00212 | 6.83190 | −0.77084 | 1.89721 |
| 2 | 4 | −15.72872 | 9.56240 | −0.26444 | 1.33694 |
| 3 | 10 | −53.43006 | 0.70000 | −0.16915 | 0.13413 |
| 4 | 12 | 19.35651 | 24.30460 | 5.05052 | 8.87194 |

TABLE 7

(Zoom lens unit magnification)

| Unit | Initial surface No. | Wide | Middle | Telephoto |
|---|---|---|---|---|
| 1 | 1 | 0.00000 | 0.00000 | 0.00000 |
| 2 | 4 | −0.31967 | −0.37545 | −0.46362 |
| 3 | 10 | 0.61744 | 0.61543 | 0.59900 |
| 4 | 12 | −1.04226 | −1.49355 | −2.08458 |

Numerical Example 2

Figure 4:
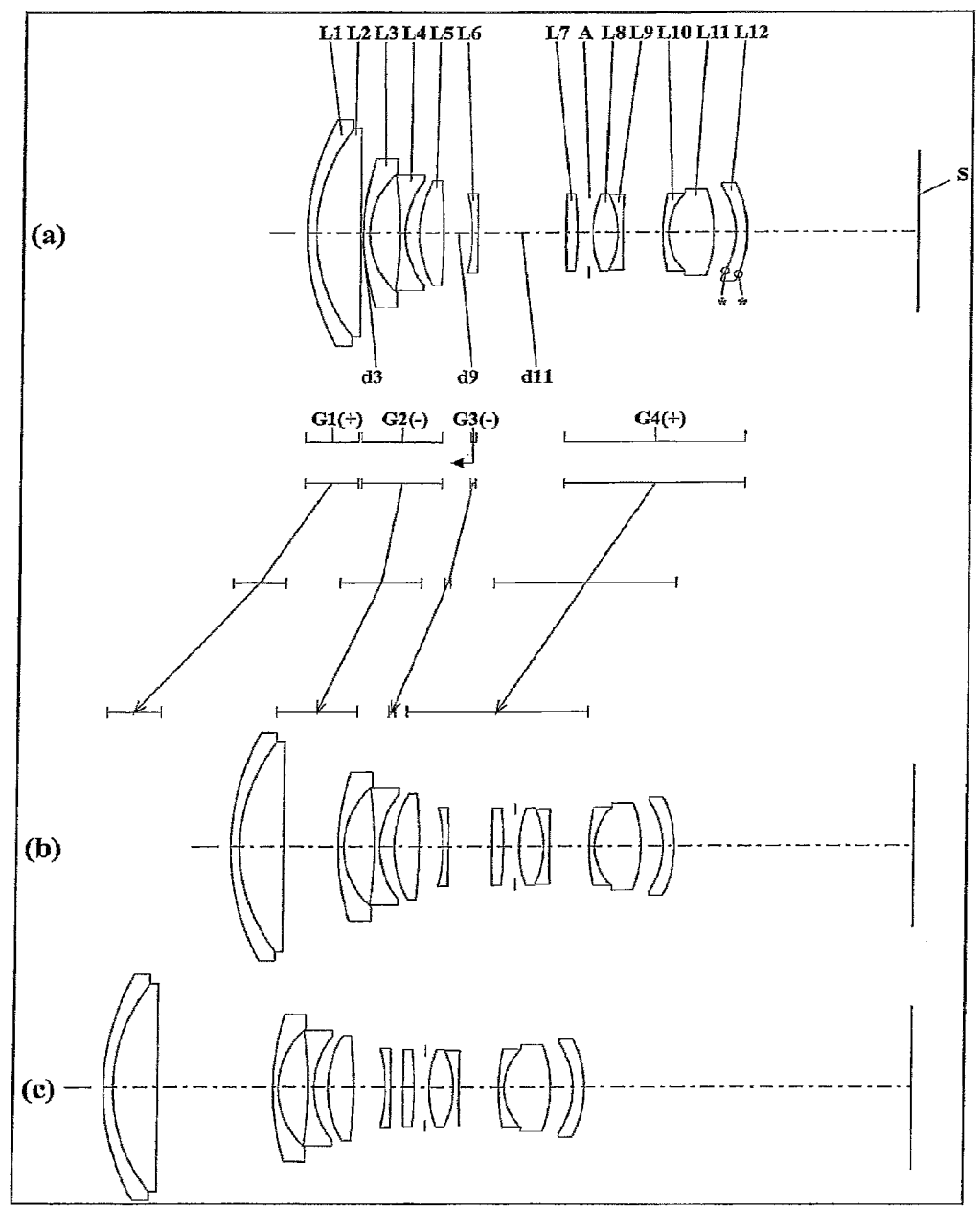
FIG. 4 is a lens arrangement diagram showing an infinity in-focus condition of a zoom lens system according to Embodiment 2 (Example 2).
Figure 5:
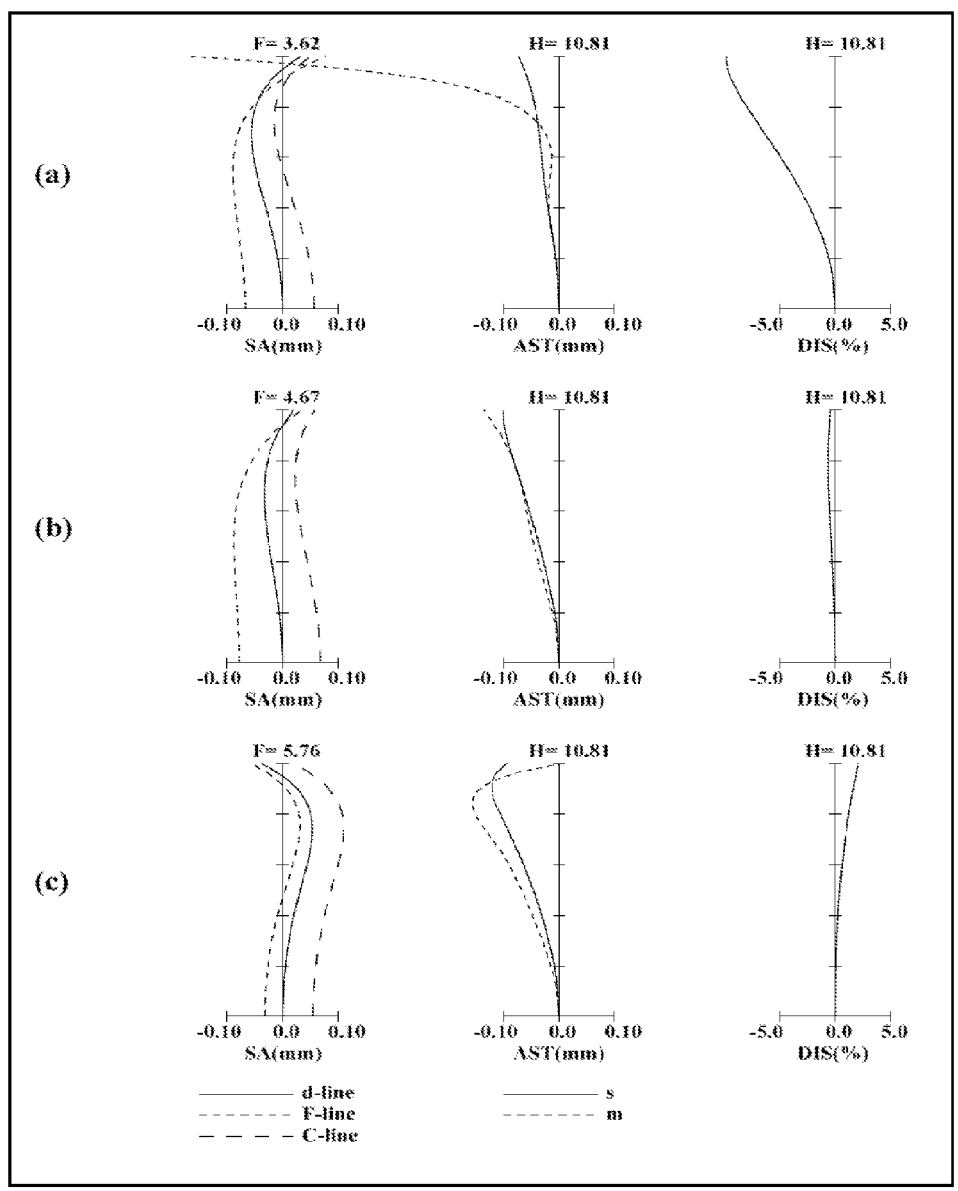
FIG. 5 is a longitudinal aberration diagram of the zoom lens system according to Example 2 in an infinity in-focus condition.
Figure 6:
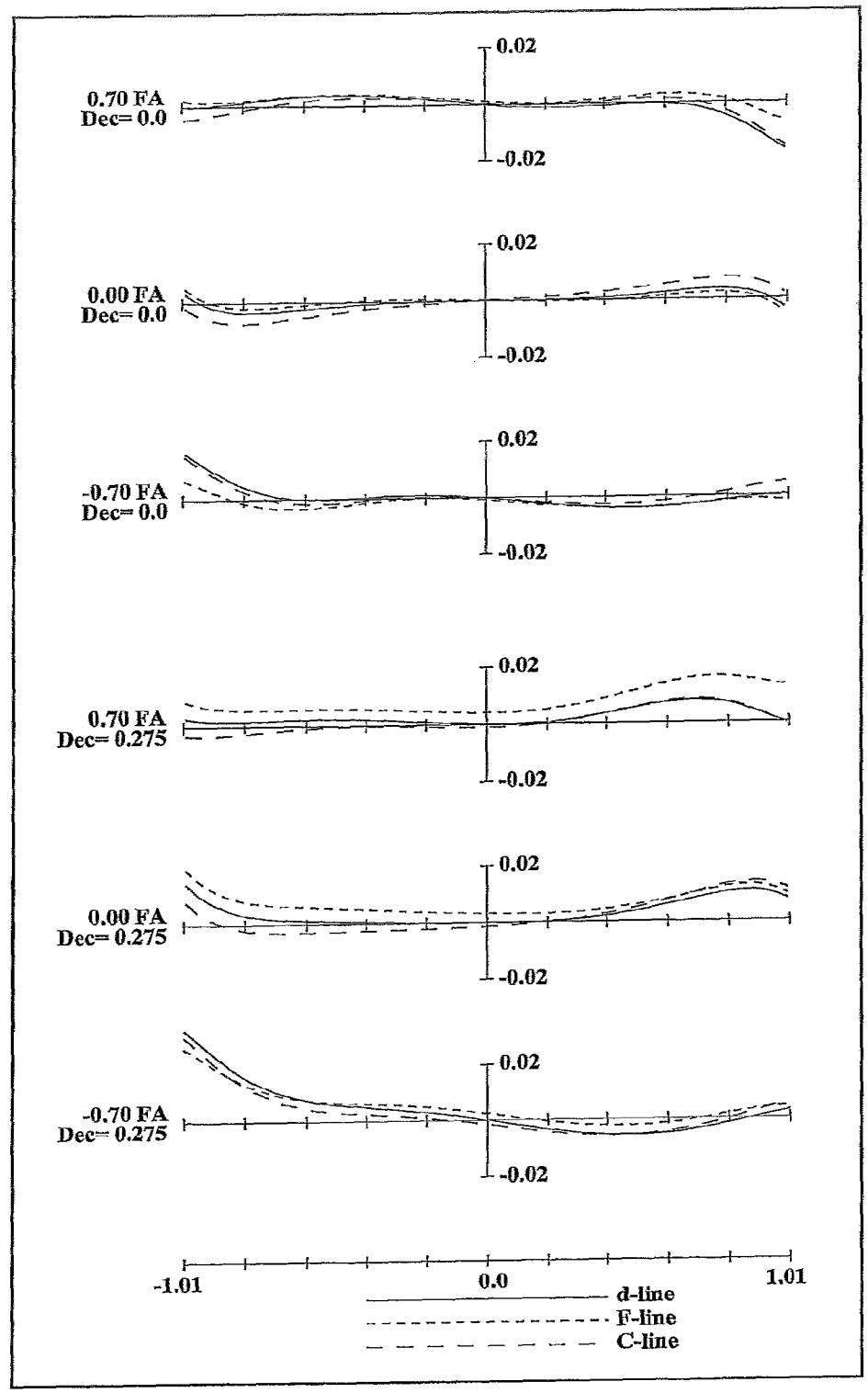
FIG. 6 is a lateral aberration diagram of the zoom lens system according to Example 2 at a telephoto limit in a basic state where image blur compensation is not performed and in an image blur compensation state.

The zoom lens system of Numerical Example 2 corresponds to Embodiment 2 (FIG. 4). The surface data, the aspheric surface data, the various data, the lens element data, the zoom lens unit data, and the zoom lens unit magnification are shown in Tables 8, 9, 10, 11, 12, and 13, respectively.

TABLE 8

(Surface data)

| Surface number | r | d | nd | vd |
|---|---|---|---|---|
| Object surface | ∞ | | | |
| 1 | 34.81640 | 1.20000 | 1.84666 | 23.8 |
| 2 | 25.04840 | 5.76580 | 1.58913 | 61.3 |
| 3 | −4281.80260 | Variable | | |
| 4 | 36.49200 | 0.70000 | 1.77250 | 49.6 |
| 5 | 11.63370 | 3.94740 | | |
| 6 | −57.69330 | 0.70000 | 1.83481 | 42.7 |
| 7 | 12.31460 | 1.84990 | | |
| 8 | 15.66210 | 3.28110 | 1.84666 | 23.8 |
| 9 | −73.37440 | Variable | | |
| 10 | −23.99440 | 0.70000 | 1.80610 | 40.7 |
| 11 | −303.00270 | Variable | | |
| 12 | 252.00270 | 1.45400 | 1.69680 | 55.5 |
| 13 | −50.93810 | 1.50000 | | |
| 14(Aperture) | ∞ | 0.50000 | | |
| 15 | 16.36830 | 3.14470 | 1.71300 | 53.9 |
| 16 | −13.12580 | 0.70000 | 1.80610 | 33.3 |
| 17 | 216.78870 | 5.15430 | | |
| 18 | 28.70680 | 0.70000 | 1.71300 | 53.9 |
| 19 | 8.02540 | 5.91130 | 1.48749 | 70.4 |
| 20 | −18.77270 | 2.86970 | | |
| 21* | −13.27990 | 1.50000 | 1.52996 | 55.8 |
| 22* | −18.41360 | BF | | |
| Image surface | ∞ | | | |

TABLE 9

(Aspheric surface data)

| Surface No. | Parameters |
|---|---|
| 21 | $K = 0.00000E+00, A4 = -2.02386E-04, A6 = 1.60650E-06, A8 = 2.25837E-08$ |
| 22 | $K = 0.00000E+00, A4 = -1.85067E-04, A6 = 1.44344E-06, A8 = 0.00000E+00$ |

TABLE 10

(Various data)
Zooming ratio 2.81399

| | Wide | Middle | Telephoto |
|---|---|---|---|
| Focal length | 14.3988 | 24.1535 | 40.5180 |
| F-number | 3.61905 | 4.67350 | 5.75507 |
| View angle | 39.8048 | 24.2146 | 14.6513 |
| Image height | 10.8150 | 10.8150 | 10.8150 |
| Overall length of lens system | 79.4123 | 88.7082 | 104.8128 |
| BF | 22.41253 | 31.22306 | 42.53823 |
| d3 | 0.4000 | 7.0992 | 14.9969 |
| d9 | 3.6995 | 3.1356 | 4.0995 |
| d11 | 11.3221 | 5.6721 | 1.6000 |
| Entrance pupil position | 18.6324 | 29.2744 | 47.0361 |
| Exit pupil position | −18.5675 | −18.5675 | −18.5675 |
| Front principal point position | 27.9720 | 41.7110 | 60.6874 |
| Back principal point position | 65.0135 | 64.5546 | 64.2948 |

TABLE 11

(Lens element data)

| Unit | Initial surface No. | Focal length |
|---|---|---|
| 1 | 1 | −111.7441 |
| 2 | 2 | 42.2914 |
| 3 | 4 | −22.3825 |
| 4 | 6 | −12.1015 |
| 5 | 8 | 15.5066 |
| 6 | 10 | −32.3619 |
| 7 | 12 | 60.9309 |
| 8 | 15 | 10.6910 |
| 9 | 16 | −15.3327 |
| 10 | 18 | −15.8469 |
| 11 | 19 | 12.4312 |
| 12 | 21 | −100.0004 |

TABLE 12

(Zoom lens unit data)

| Unit | Initial surface No. | Focal length | Length of lens unit | Front principal point position | Back principal point position |
|---|---|---|---|---|---|
| 1 | 1 | 69.79699 | 6.96580 | −0.42501 | 2.26707 |
| 2 | 4 | −21.92420 | 10.47840 | −2.01550 | −1.97491 |
| 3 | 10 | −32.36192 | 0.70000 | −0.03337 | 0.27862 |
| 4 | 12 | 18.53595 | 23.43400 | 4.88051 | 7.72468 |

TABLE 13

(Zoom lens unit magnification)

| Unit | Initial surface No. | Wide | Middle | Telephoto |
|---|---|---|---|---|
| 1 | 1 | 0.00000 | 0.00000 | 0.00000 |
| 2 | 4 | −0.48949 | −0.57558 | −0.72614 |
| 3 | 10 | 0.39885 | 0.39245 | 0.37315 |
| 4 | 12 | −1.05664 | −1.53197 | −2.14241 |

Numerical Example 3

Figure 7:
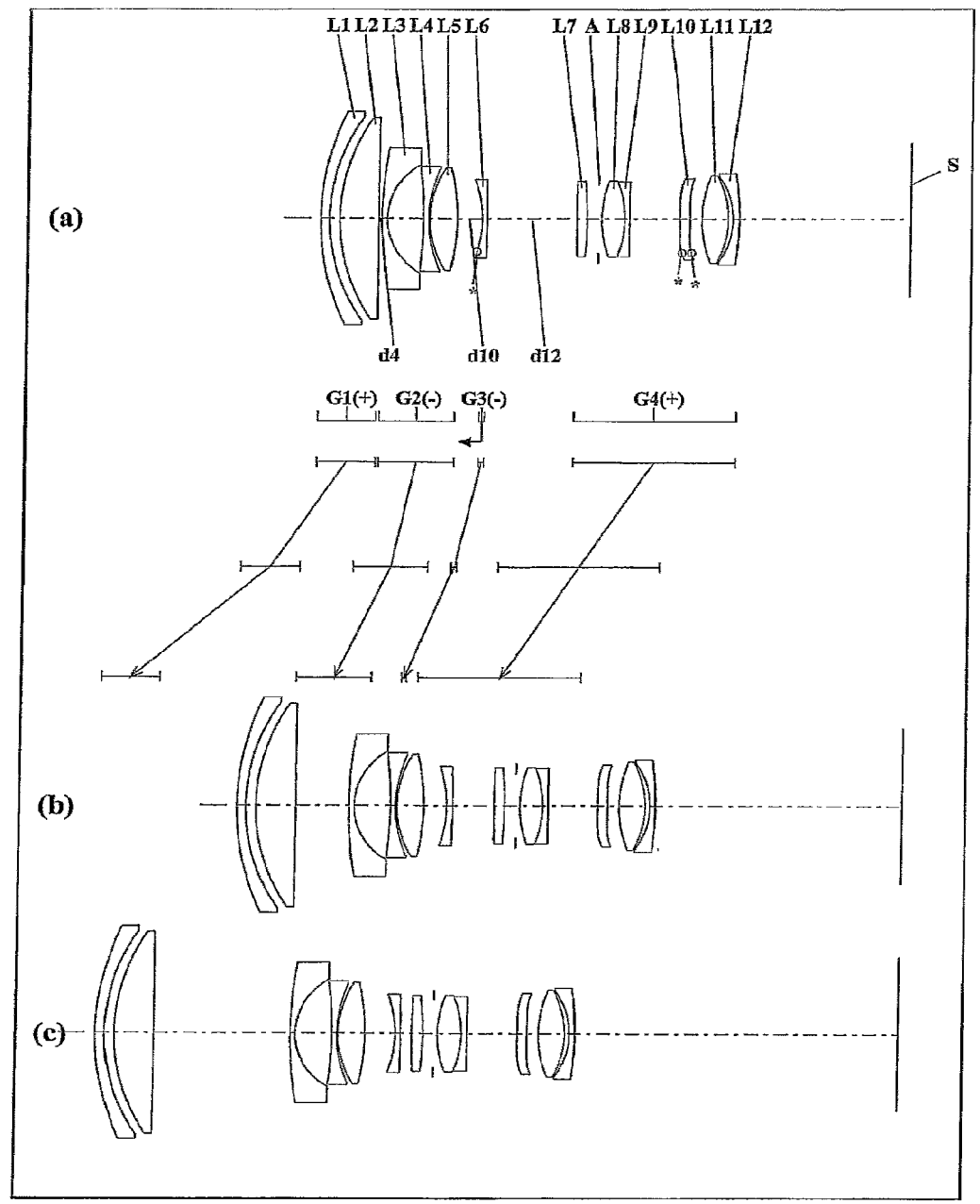
FIG. 7 is a lens arrangement diagram showing an infinity in-focus condition of a zoom lens system according to Embodiment 3 (Example 3).
Figure 8:
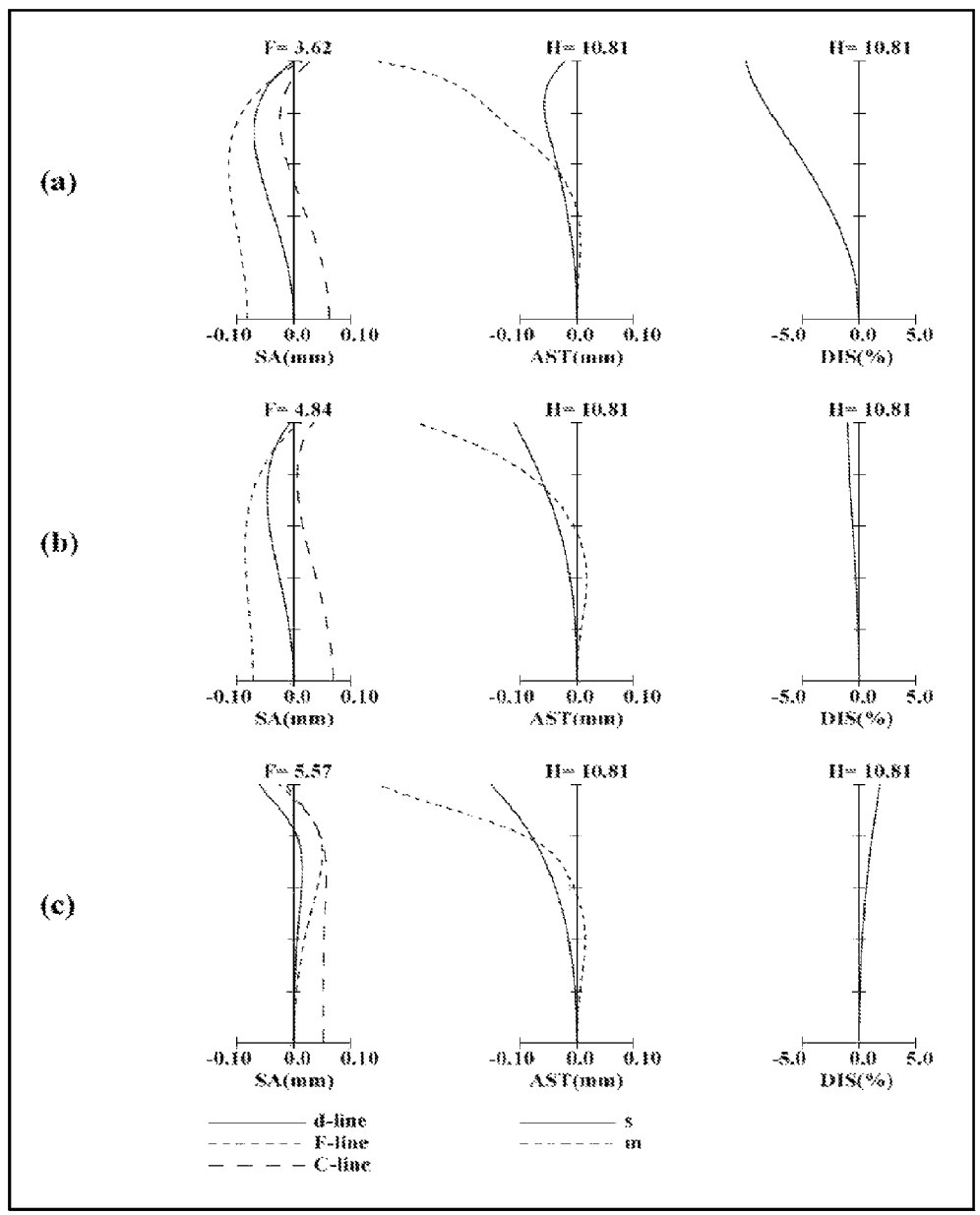
FIG. 8 is a longitudinal aberration diagram of the zoom lens system according to Example 3 in an infinity in-focus condition.
Figure 9:
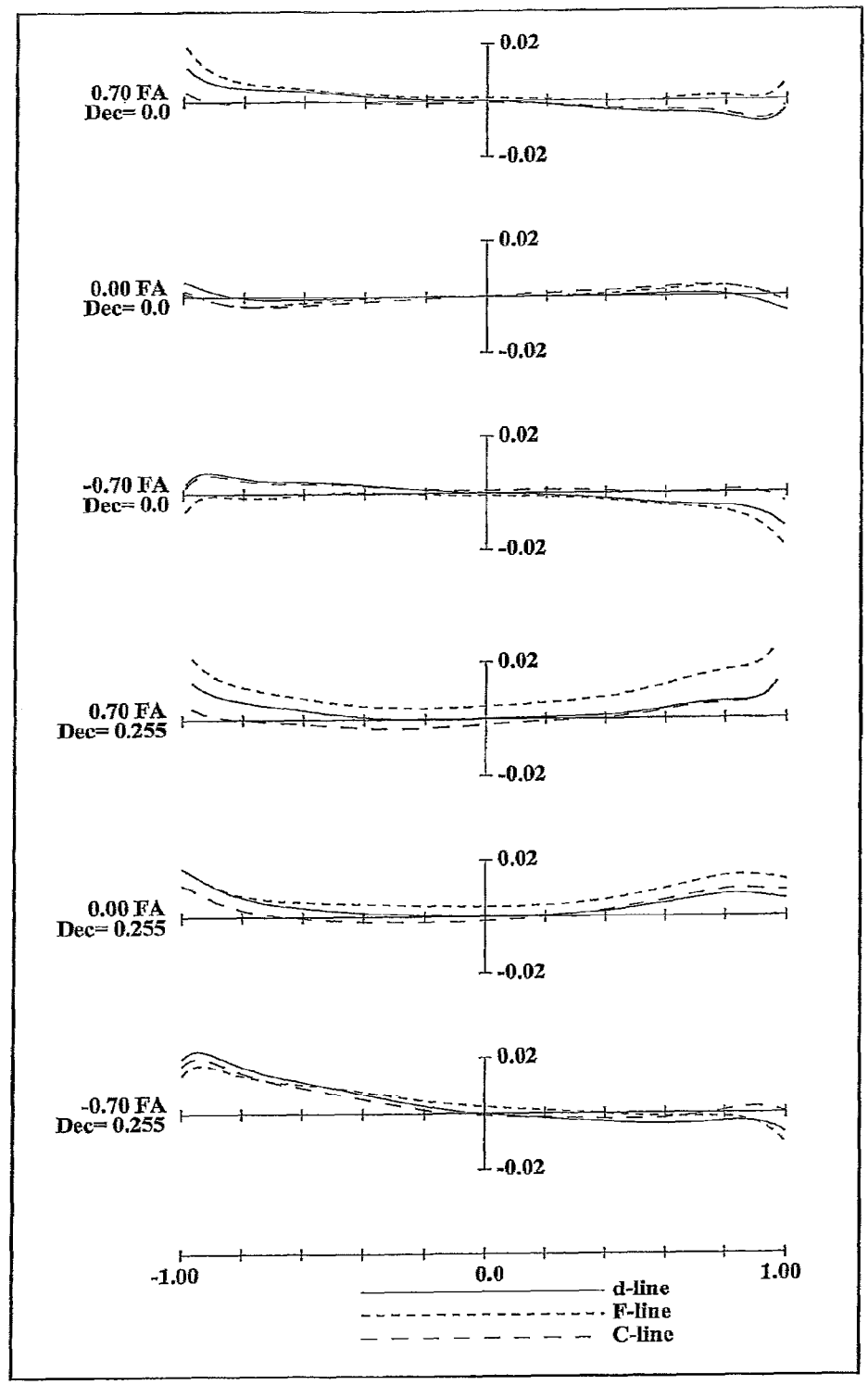
FIG. 9 is a lateral aberration diagram of the zoom lens system according to Example 3 at a telephoto limit in a basic state where image blur compensation is not performed and in an image blur compensation state.

The zoom lens system of Numerical Example 3 corresponds to Embodiment 3 (FIG. 7). The surface data, the aspheric surface data, the various data, the lens element data, the zoom lens unit data, and the zoom lens unit magnification are shown in Tables 14, 15, 16, 17, 18, and 19, respectively.

TABLE 14

(Surface data)

| Surface number | r | d | nd | vd |
|---|---|---|---|---|
| Object surface | ∞ | | | |
| 1 | 37.32260 | 1.20000 | 1.84666 | 23.8 |
| 2 | 26.94840 | 1.42300 | | |
| 3 | 27.41330 | 5.36740 | 1.58913 | 61.3 |
| 4 | −3741.80660 | Variable | | |
| 5 | 62.26820 | 0.70000 | 1.77250 | 49.6 |
| 6 | 9.19270 | 5.02000 | | |
| 7 | −59.93660 | 0.70000 | 1.77250 | 49.6 |
| 8 | 18.71730 | 0.15000 | | |
| 9 | 14.41930 | 3.72090 | 1.71736 | 29.5 |
| 10 | −33.16660 | Variable | | |
| 11* | −17.14010 | 0.70000 | 1.52996 | 55.8 |
| 12 | −244.91550 | Variable | | |
| 13 | 204.25790 | 1.50000 | 1.71300 | 53.9 |
| 14 | −53.73270 | 1.50000 | | |
| 15(Aperture) | ∞ | 0.50000 | | |
| 16 | 15.70190 | 3.23680 | 1.62299 | 58.1 |
| 17 | −14.70420 | 0.70000 | 1.80610 | 33.3 |
| 18* | 435.01800 | 6.90350 | | |
| 19* | −236.86850 | 1.34750 | 1.52996 | 55.8 |
| 20* | −90.55840 | 1.61150 | | |
| 21 | 17.26040 | 3.61070 | 1.48749 | 70.4 |
| 22 | −13.93540 | 0.65960 | | |
| 23 | −11.01420 | 0.80000 | 1.77250 | 49.6 |
| 24 | −51.06640 | BF | | |
| Image surface | ∞ | | | |

TABLE 15

(Aspheric surface data)

| Surface No. | Parameters |
|---|---|
| 11 | $K = 0.00000E+00, A4 = 1.39196E-05, A6 = -8.50233E-08, A8 = -2.35288E-09, A10 = 0.00000E+00$ |
| 19 | $K = 0.00000E+00, A4 = 5.70926E-04, A6 = -7.94359E-07, A8 = 4.53692E-08, A10 = -1.69327E-10$ |
| 20 | $K = 0.00000E+00, A4 = 5.49448E-04, A6 = 1.12374E-07, A8 = 3.79362E-08, A10 = 0.00000E+00$ |

TABLE 16

(Various data)
Zooming ratio 3.01496

| | Wide | Middle | Telephoto |
|---|---|---|---|
| Focal length | 14.4002 | 25.0041 | 43.4162 |
| F-number | 3.62449 | 4.83510 | 5.56588 |
| View angle | 39.8403 | 23.6095 | 13.7447 |
| Image height | 10.8150 | 10.8150 | 10.8150 |
| Overall length of lens system | 80.9714 | 91.0636 | 109.9580 |
| BF | 23.48347 | 33.56829 | 44.18262 |
| d4 | 0.4000 | 7.3024 | 18.7180 |
| d10 | 3.4065 | 3.1847 | 4.1065 |
| d12 | 12.3305 | 5.6573 | 1.6000 |
| Entrance pupil position | 18.3357 | 28.1745 | 52.8511 |
| Exit pupil position | −16.0456 | −16.0456 | −16.0456 |
| Front principal point position | 27.4900 | 40.5772 | 64.9702 |
| Back principal point position | 66.5711 | 66.0595 | 66.5418 |

TABLE 17

(Lens element data)

| Unit | Initial surface No. | Focal length |
|---|---|---|
| 1 | 1 | −120.9218 |
| 2 | 3 | 46.2179 |
| 3 | 5 | −14.0417 |
| 4 | 7 | −18.3923 |
| 5 | 9 | 14.4828 |
| 6 | 11 | −34.8131 |
| 7 | 13 | 59.8104 |
| 8 | 16 | 12.7077 |
| 9 | 17 | −17.6325 |
| 10 | 19 | 275.7626 |
| 11 | 21 | 16.4400 |
| 12 | 23 | −18.3384 |

TABLE 18

(Zoom lens unit data)

| Unit | Initial surface No. | Focal length | Length of lens unit | Front principal point position | Back principal point position |
|---|---|---|---|---|---|
| 1 | 1 | 75.14899 | 7.99040 | 1.92412 | 4.42746 |
| 2 | 5 | −23.94733 | 10.29090 | −3.34002 | −3.44835 |
| 3 | 11 | −34.81307 | 0.70000 | −0.03447 | 0.20752 |
| 4 | 13 | 18.89608 | 22.36960 | 3.79459 | 7.79886 |

TABLE 19

(Zoom lens unit magnification)

| Unit | Initial surface No. | Wide | Middle | Telephoto |
|---|---|---|---|---|
| 1 | 1 | 0.00000 | 0.00000 | 0.00000 |
| 2 | 5 | −0.47347 | −0.54829 | −0.74231 |
| 3 | 11 | 0.39919 | 0.39213 | 0.36899 |
| 4 | 13 | −1.01387 | −1.54757 | −2.10929 |

Numerical Example 4

Figure 10:
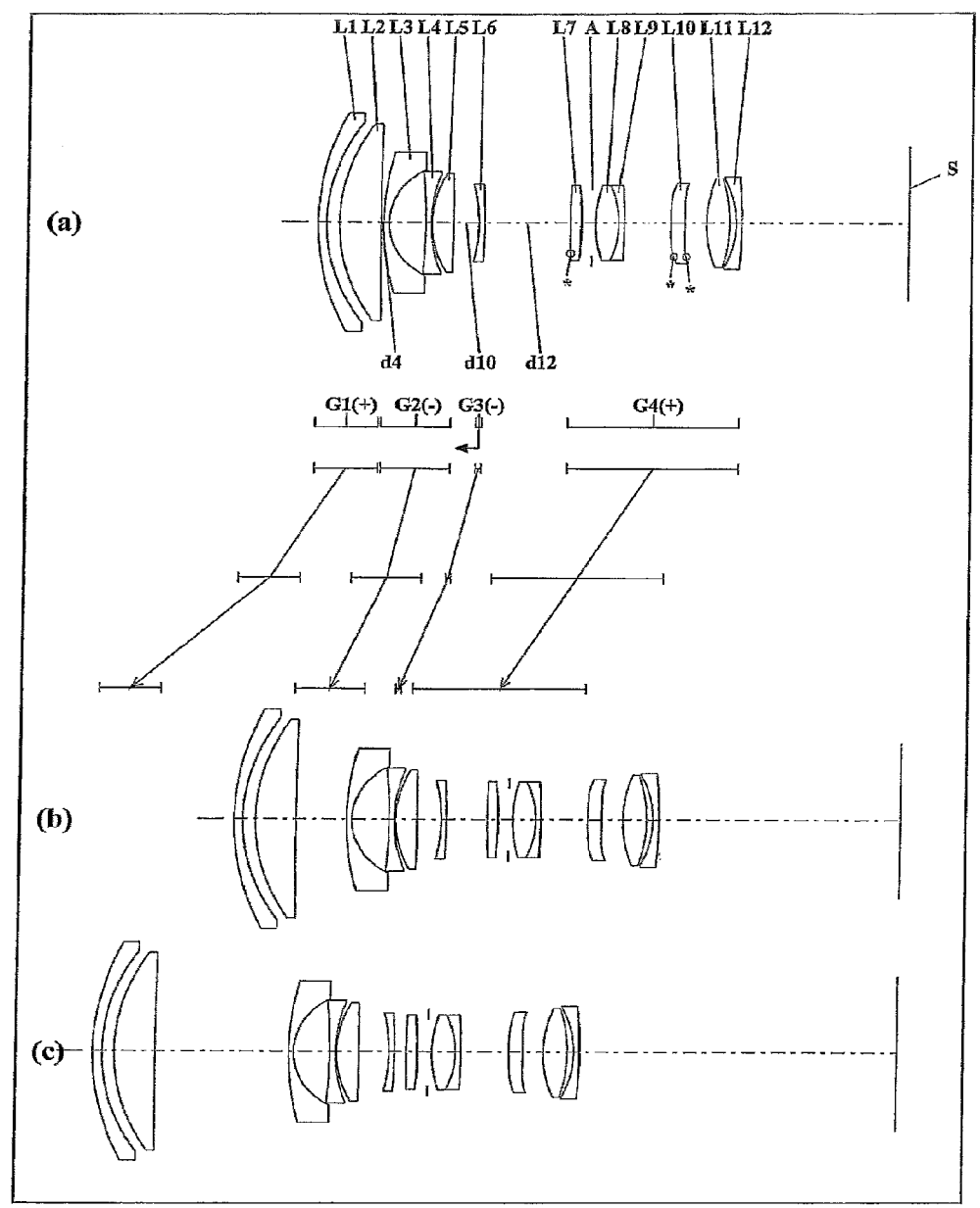
FIG. 10 is a lens arrangement diagram showing an infinity in-focus condition of a zoom lens system according to Embodiment 4 (Example 4).
Figure 11:
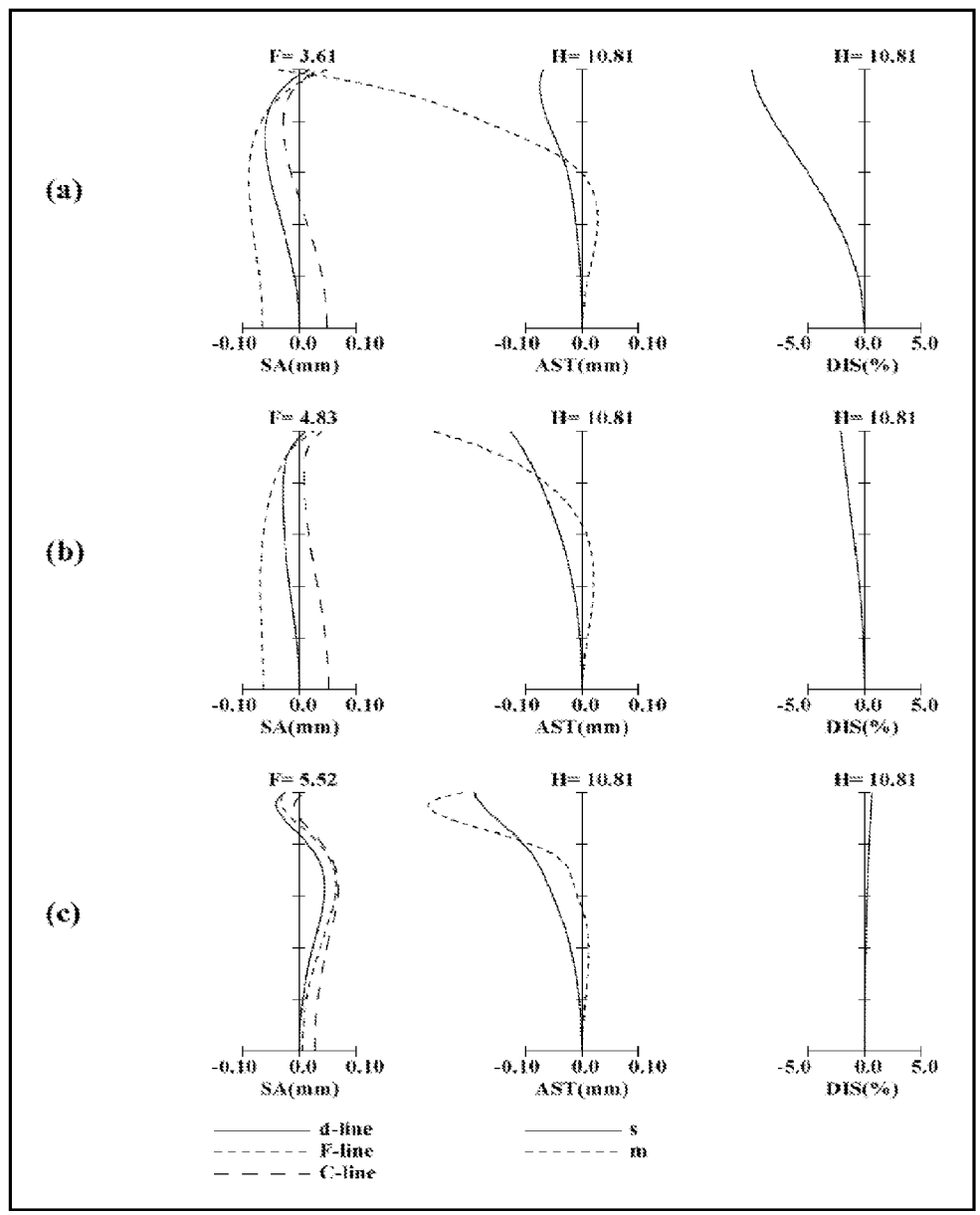
FIG. 11 is a longitudinal aberration diagram of the zoom lens system according to Example 4 in an infinity in-focus condition.
Figure 12:
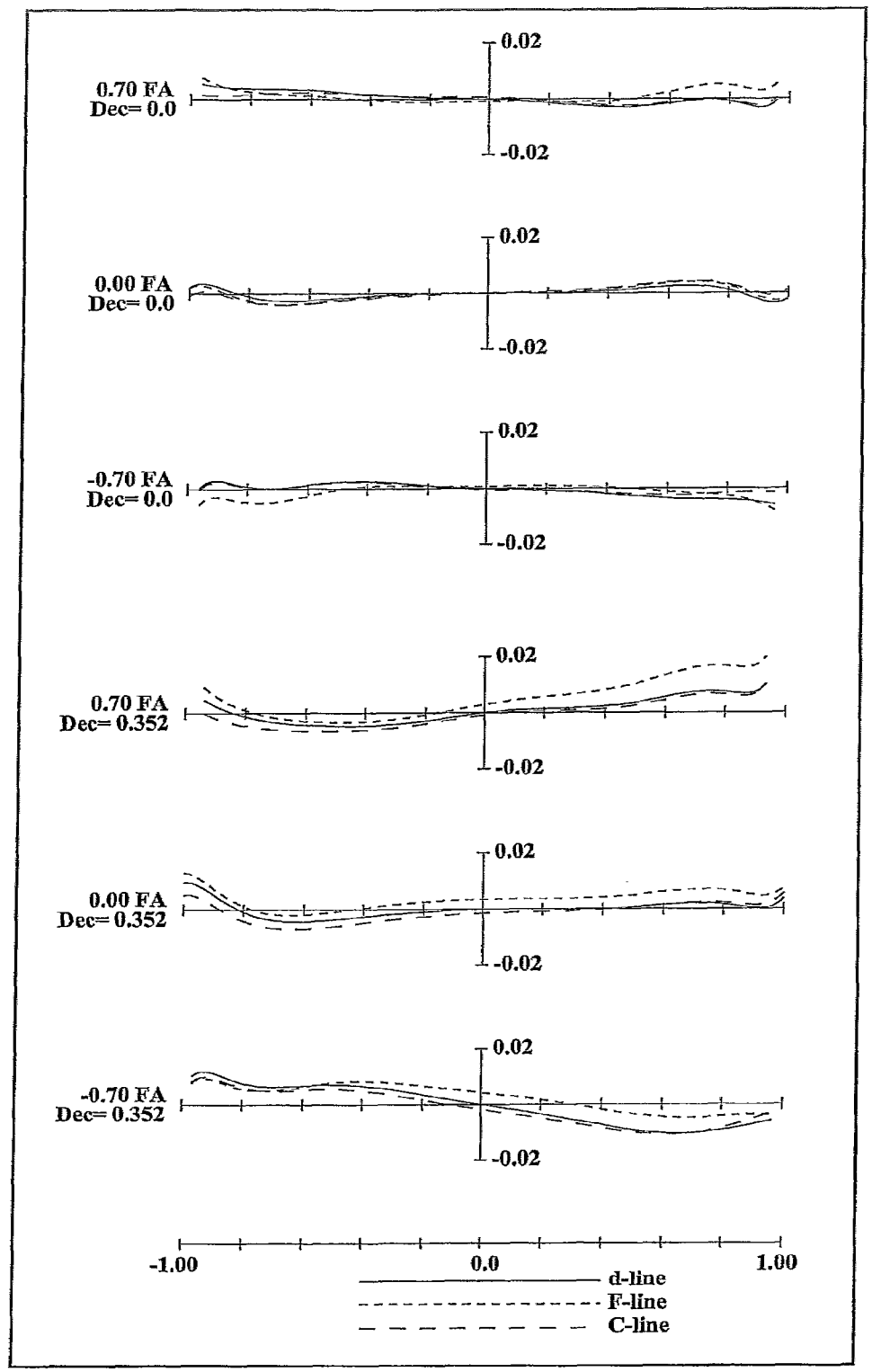
FIG. 12 is a lateral aberration diagram of the zoom lens system according to Example 4 at a telephoto limit in a basic state where image blur compensation is not performed and in an image blur compensation state.

The zoom lens system of Numerical Example 4 corresponds to Embodiment 4 (FIG. 10). The surface data, the aspheric surface data, the various data, the lens element data, the zoom lens unit data, and the zoom lens unit magnification are shown in Tables 20, 21, 22, 23, 24, and 25, respectively.

TABLE 20

(Surface data)

| Surface number | r | d | nd | vd |
|---|---|---|---|---|
| Object surface | ∞ | | | |
| 1 | 34.58860 | 1.20000 | 1.84666 | 23.8 |
| 2 | 24.73020 | 1.68270 | | |
| 3 | 24.90680 | 5.60520 | 1.58913 | 61.3 |
| 4 | 647.45250 | Variable | | |
| 5 | 38.78230 | 0.70000 | 1.77250 | 49.6 |
| 6 | 8.59640 | 5.02000 | | |
| 7 | −70.88560 | 0.70000 | 1.77250 | 49.6 |
| 8 | 20.17810 | 0.15000 | | |
| 9 | 14.52510 | 2.92050 | 1.84666 | 23.8 |
| 10 | −363.32930 | Variable | | |
| 11 | −24.35070 | 0.70000 | 1.80610 | 40.7 |
| 12 | −108.62990 | Variable | | |
| 13* | 111.70590 | 1.50000 | 1.52996 | 55.8 |
| 14 | −60.47860 | 1.50000 | | |
| 15(Aperture) | ∞ | 0.50000 | | |
| 16 | 17.81270 | 3.21810 | 1.62041 | 60.3 |
| 17 | −12.71740 | 0.70000 | 1.80610 | 33.3 |
| 18 | −103.52570 | 6.48300 | | |
| 19* | 97.52070 | 1.90600 | 1.52996 | 55.8 |
| 20* | −130.55850 | 2.90870 | | |
| 21 | 16.81410 | 3.29850 | 1.48749 | 70.4 |
| 22 | −21.38630 | 0.91360 | | |
| 23 | −13.42820 | 0.80000 | 1.77250 | 49.6 |
| 24 | −77.41170 | BF | | |
| Image surface | ∞ | | | |

TABLE 21

(Aspheric surface data)

| Surface No. | Parameters |
|---|---|
| 13 | K = 0.00000E+00, A4 = −1.13941E−05, A6 = 1.53340E−07, A8 = −2.82359E−10, A10 = 0.00000E+00 |
| 19 | K = 0.00000E+00, A4 = 4.63655E−04, A6 = −1.84239E−07, A8 = 5.83649E−08, A10 = −3.63492E−10 |
| 20 | K = 0.00000E+00, A4 = 4.46471E−04, A6 = 8.56266E−07, A8 = 5.42542E−08, A10 = 0.00000E+00 |

TABLE 22

(Various data)
Zooming ratio 3.01501

| | Wide | Middle | Telephoto |
|---|---|---|---|
| Focal length | 14.3994 | 25.0028 | 43.4142 |
| F-number | 3.61279 | 4.82536 | 5.52388 |
| View angle | 39.8262 | 23.8400 | 13.8944 |
| Image height | 10.8150 | 10.8150 | 10.8150 |
| Overall length of lens system | 80.9632 | 91.1399 | 109.9409 |
| BF | 22.77225 | 32.98361 | 43.35881 |
| d4 | 0.4000 | 6.9522 | 18.4058 |
| d10 | 3.4700 | 3.2891 | 4.1700 |
| d12 | 11.9146 | 5.5087 | 1.6000 |
| Entrance pupil position | 18.9921 | 28.4261 | 53.6396 |
| Exit pupil position | −16.9442 | −16.9442 | −16.9442 |
| Front principal point position | 28.1709 | 40.9080 | 65.7984 |
| Back principal point position | 66.5638 | 66.1371 | 66.5267 |

TABLE 23

(Lens element data)

| Unit | Initial surface No. | Focal length |
|---|---|---|
| 1 | 1 | −108.5383 |
| 2 | 3 | 43.8225 |
| 3 | 5 | −14.4431 |
| 4 | 7 | −20.2648 |
| 5 | 9 | 16.5549 |
| 6 | 11 | −39.0807 |
| 7 | 13 | 74.2597 |
| 8 | 16 | 12.4627 |
| 9 | 17 | −18.0480 |
| 10 | 19 | 105.6409 |
| 11 | 21 | 19.8721 |
| 12 | 23 | −21.1461 |

TABLE 24

(Zoom lens unit data)

| Unit | Initial surface No. | Focal length | Length of lens unit | Front principal point position | Back principal point position |
|---|---|---|---|---|---|
| 1 | 1 | 73.70704 | 8.48790 | 2.10453 | 4.70655 |
| 2 | 5 | −19.33088 | 9.49050 | −1.03958 | 0.20119 |
| 3 | 11 | −39.08066 | 0.70000 | −0.11240 | 0.19859 |
| 4 | 13 | 18.50764 | 23.72790 | 4.33235 | 8.77998 |

TABLE 25

(Zoom lens unit magnification)

| Unit | Initial surface No. | Wide | Middle | Telephoto |
|---|---|---|---|---|
| 1 | 1 | 0.00000 | 0.00000 | 0.00000 |
| 2 | 5 | −0.37730 | −0.43263 | −0.58175 |
| 3 | 11 | 0.49878 | 0.49319 | 0.47083 |
| 4 | 13 | −1.03809 | −1.58982 | −2.15041 |

Numerical Example 5

Figure 13:
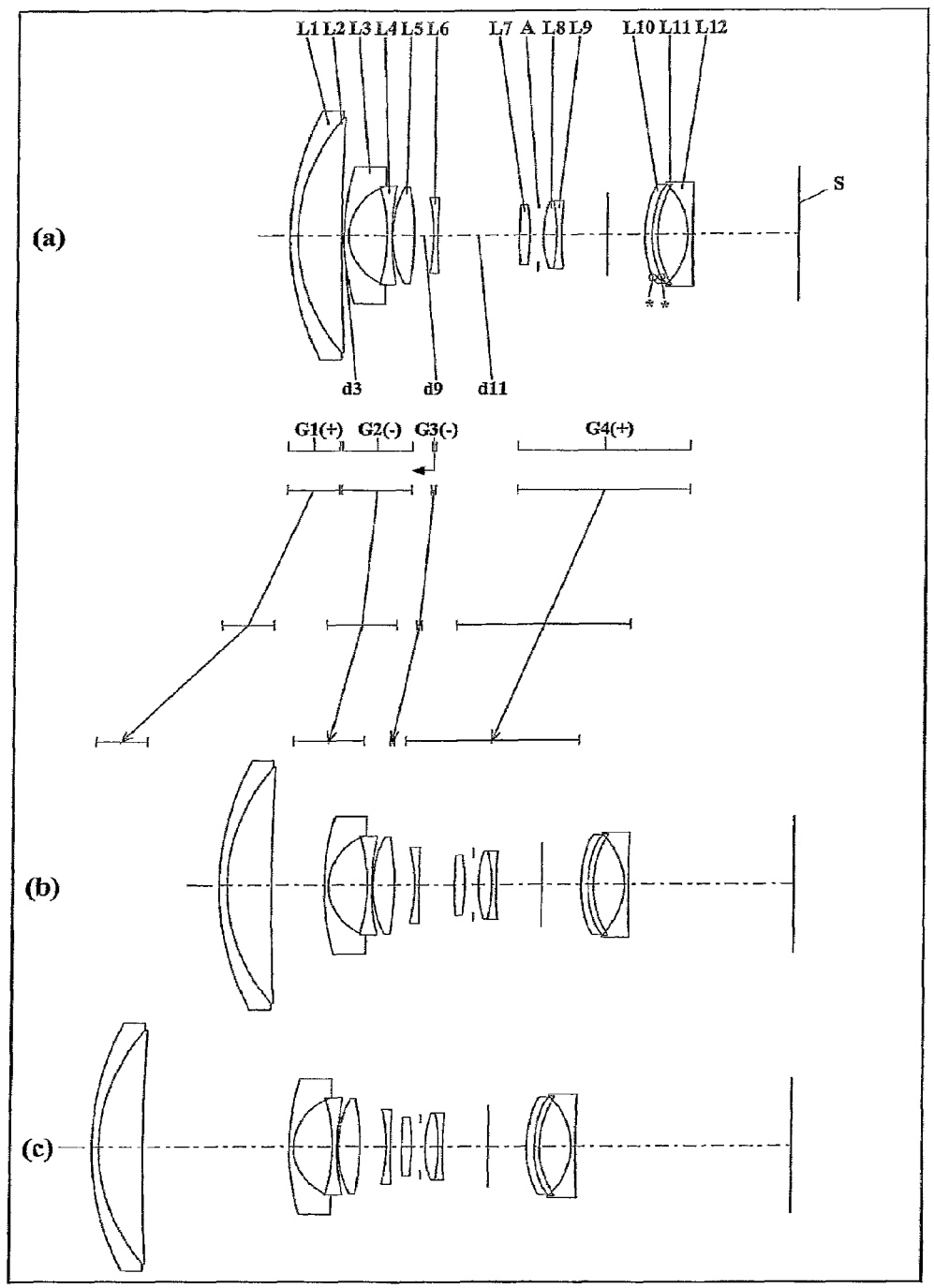
FIG. 13 is a lens arrangement diagram showing an infinity in-focus condition of a zoom lens system according to Embodiment 5 (Example 5).
Figure 14:
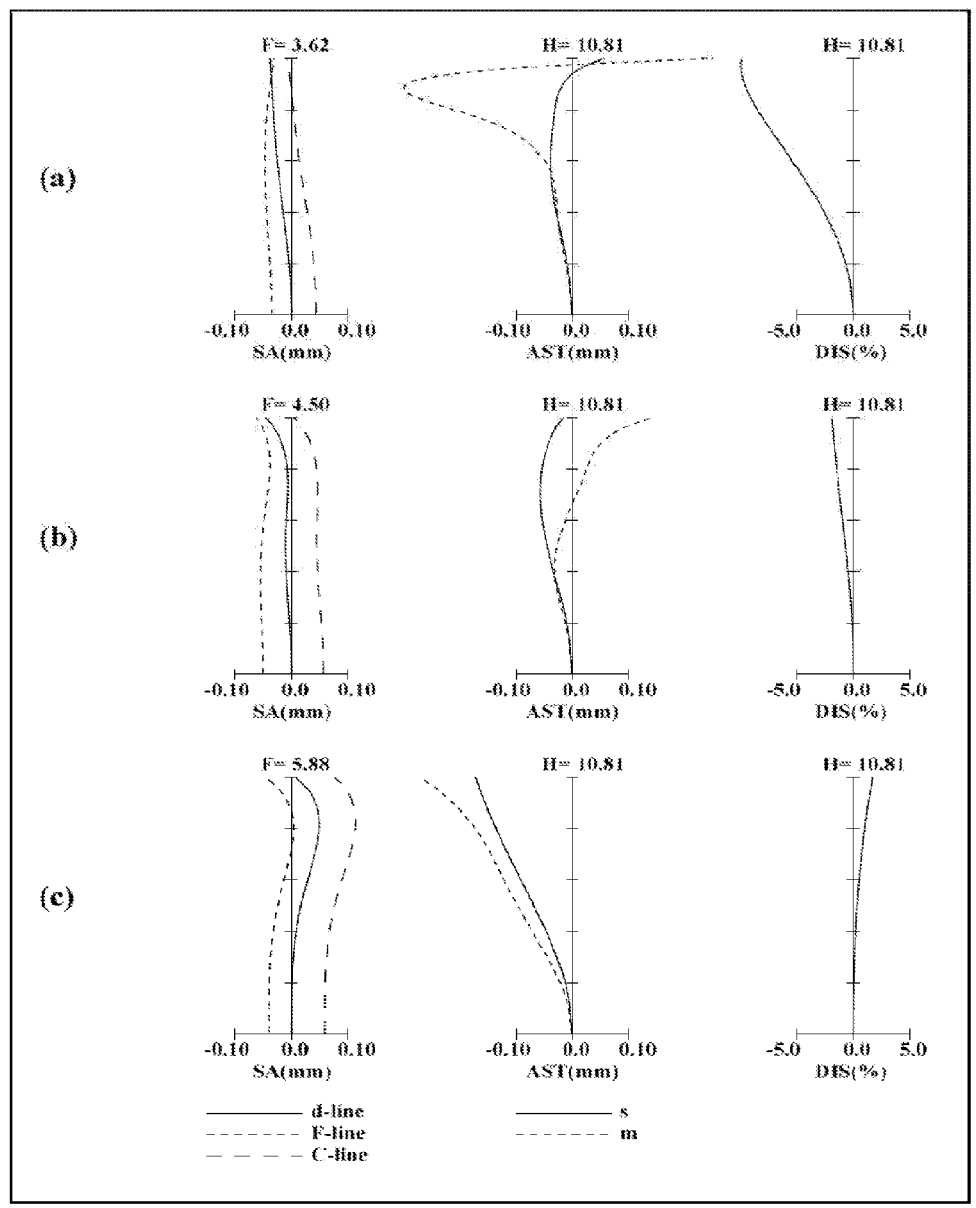
FIG. 14 is a longitudinal aberration diagram of the zoom lens system according to Example 5 in an infinity in-focus condition.
Figure 15:
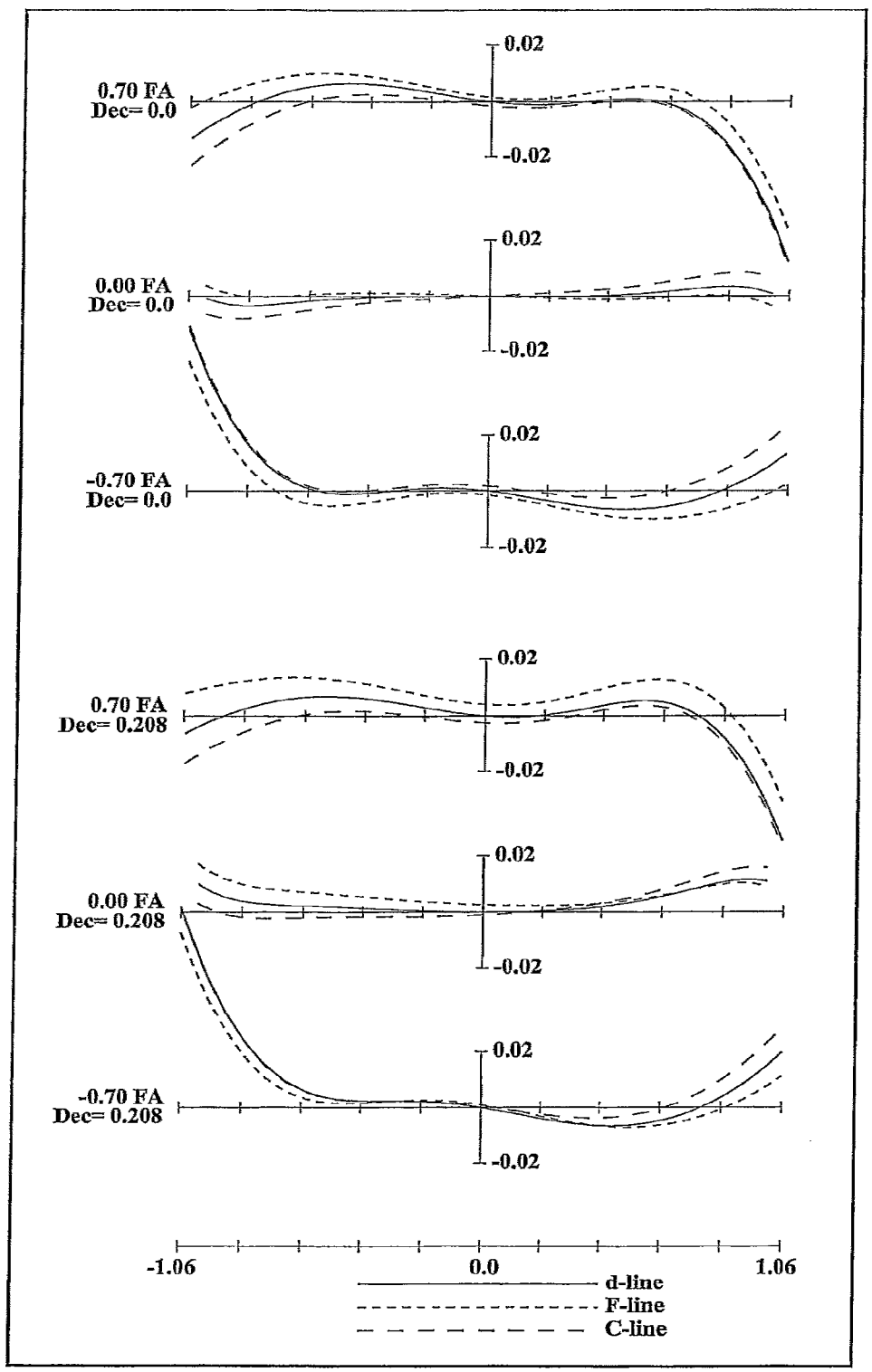
FIG. 15 is a lateral aberration diagram of the zoom lens system according to Example 5 at a telephoto limit in a basic state where image blur compensation is not performed and in an image blur compensation state.

The zoom lens system of Numerical Example 5 corresponds to Embodiment 5 (FIG. 13). The surface data, the aspheric surface data, the various data, the lens element data, the zoom lens unit data, and the zoom lens unit magnification are shown in Tables 26, 27, 28, 29, 30, and 31, respectively.

TABLE 26

(Surface data)

| Surface number | r | d | nd | vd |
|---|---|---|---|---|
| Object surface | ∞ | | | |
| 1 | 47.65040 | 1.20000 | 1.84666 | 23.8 |
| 2 | 31.61190 | 7.01310 | 1.71300 | 53.9 |
| 3 | 397.39840 | Variable | | |
| 4 | 43.46490 | 0.70000 | 1.71300 | 53.9 |
| 5 | 9.00310 | 6.16270 | | |
| 6 | −29.86210 | 0.70000 | 1.71300 | 53.9 |
| 7 | 41.45870 | 0.15000 | | |
| 8 | 18.69810 | 3.51650 | 1.80518 | 25.5 |
| 9 | −46.64210 | Variable | | |
| 10 | −28.97190 | 0.70000 | 1.83400 | 37.3 |
| 11 | 169.53010 | Variable | | |
| 12 | 79.92270 | 1.62240 | 1.61800 | 63.4 |
| 13 | −38.83920 | 1.30000 | | |
| 14(Aperture) | ∞ | 0.80000 | | |
| 15 | 17.89240 | 2.11780 | 1.71300 | 53.9 |
| 16 | −27.84220 | 0.70000 | 1.80518 | 25.5 |
| 17 | 60.13520 | 7.20000 | | |
| 18 | ∞ | 6.03890 | | |
| 19* | 22.18890 | 1.20000 | 1.52996 | 55.9 |
| 20* | 22.30780 | 0.80000 | | |
| 21 | 17.03250 | 4.91090 | 1.51823 | 59.0 |
| 22 | −12.23210 | 0.70000 | 1.71300 | 53.9 |
| 23 | 271.51730 | BF | | |
| Image surface | ∞ | | | |

TABLE 27

(Aspheric surface data)

| Surface No. | Parameters |
|---|---|
| 19 | K = 0.00000E+00, A4 = 3.31973E−05, A6 = −2.45043E−06, A8 = 5.51240E−08, A10 = −2.25928E−10 |
| 20 | K = 0.00000E+00, A4 = 8.10984E−05, A6 = −2.10215E−06, A8 = 3.77361E−08, A10 = −3.90270E−12 |

TABLE 28

(Various data)
Zooming ratio 3.02696

| | Wide | Middle | Telephoto |
|---|---|---|---|
| Focal length | 14.4217 | 25.0911 | 43.6540 |
| F-number | 3.62324 | 4.49954 | 5.88048 |
| View angle | 39.7747 | 23.7186 | 13.6860 |
| Image height | 10.8150 | 10.8150 | 10.8150 |
| Overall length of lens system | 80.9602 | 91.1806 | 110.7909 |
| BF | 17.02390 | 26.35686 | 34.37962 |
| d3 | 0.4000 | 8.4039 | 22.9412 |
| d9 | 3.1446 | 3.1955 | 4.1494 |
| d11 | 12.8594 | 5.6920 | 1.7884 |
| Entrance pupil position | 19.6432 | 31.7755 | 67.0815 |
| Exit pupil position | −22.4207 | −22.4207 | −22.4207 |
| Front principal point position | 28.7920 | 43.9598 | 77.1851 |
| Back principal point position | 66.5385 | 66.0895 | 67.1369 |

TABLE 29

(Lens element data)

| Unit | Initial surface No. | Focal length |
|---|---|---|
| 1 | 1 | −114.8688 |
| 2 | 2 | 47.7868 |
| 3 | 4 | −16.0617 |
| 4 | 6 | −24.2471 |
| 5 | 8 | 16.9845 |
| 6 | 10 | −29.6208 |
| 7 | 12 | 42.5156 |
| 8 | 15 | 15.5772 |
| 9 | 16 | −23.5521 |
| 10 | 19 | 1747.2128 |

TABLE 29-continued (Lens element data)

| Unit | Initial surface No. | Focal length |
|---|---|---|
| 11 | 21 | 14.5724 |
| 12 | 22 | -16.3994 |

TABLE 30

(Zoom lens unit data)

| Unit | Initial surface No. | Focal length | Length of lens unit | Front principal point position | Back principal point position |
|---|---|---|---|---|---|
| 1 | 1 | 83.92677 | 8.21310 | -0.94662 | 2.57496 |
| 2 | 4 | -32.20400 | 11.22920 | -5.29793 | -6.36303 |
| 3 | 10 | -29.62079 | 0.70000 | 0.05562 | 0.37455 |
| 4 | 12 | 18.93137 | 27.39000 | 4.66837 | 7.58142 |

TABLE 31

(Zoom lens unit magnification)

| Unit | Initial surface No. | Wide | Middle | Telephoto |
|---|---|---|---|---|
| 1 | 1 | 0.00000 | 0.00000 | 0.00000 |
| 2 | 4 | -0.63167 | -0.74930 | -1.13229 |
| 3 | 10 | 0.28769 | 0.27735 | 0.24666 |
| 4 | 12 | -0.94558 | -1.43857 | -1.86235 |

Numerical Example 6

Figure 16:
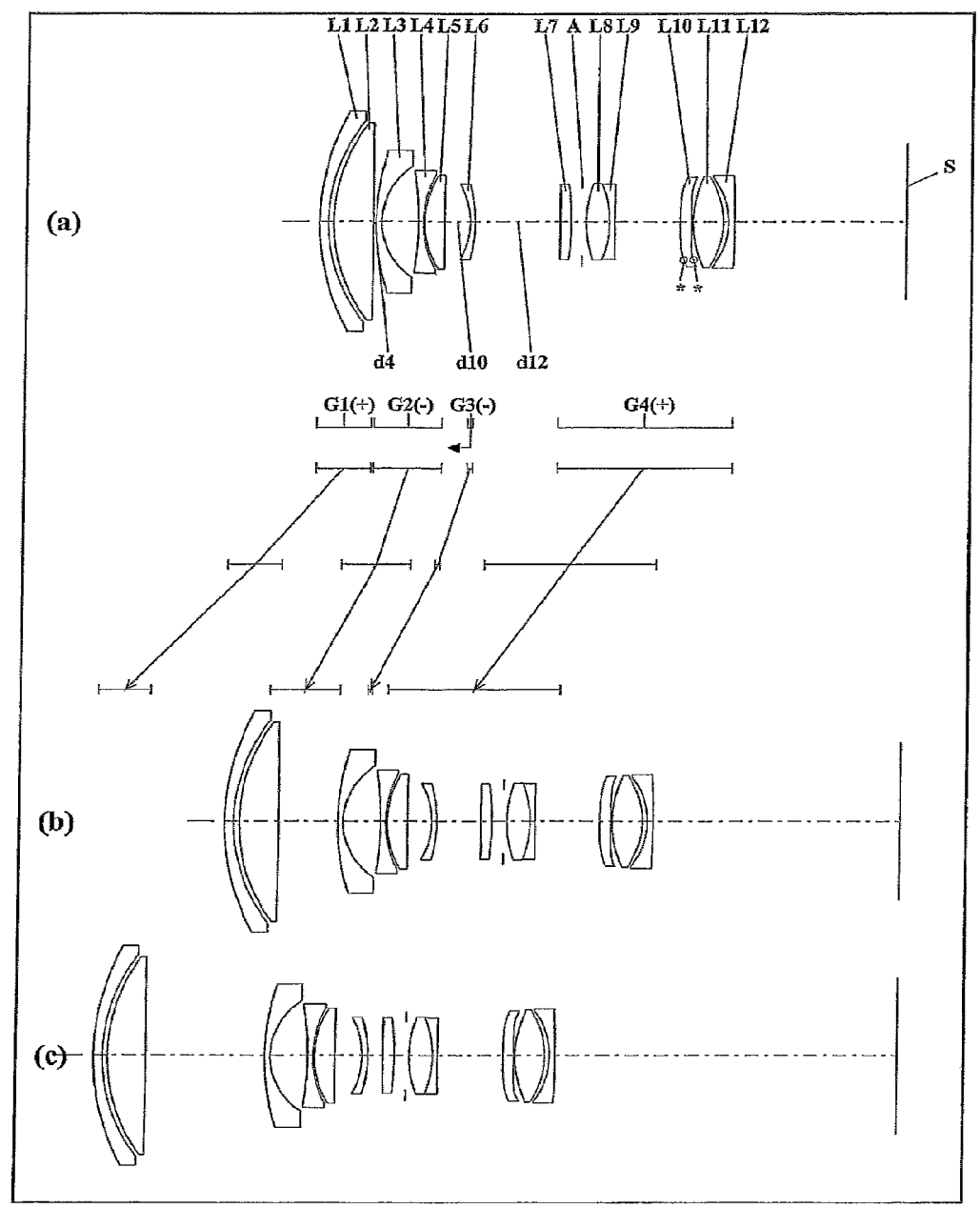
FIG. 16 is a lens arrangement diagram showing an infinity in-focus condition of a zoom lens system according to Embodiment 6 (Example 6).
Figure 17:
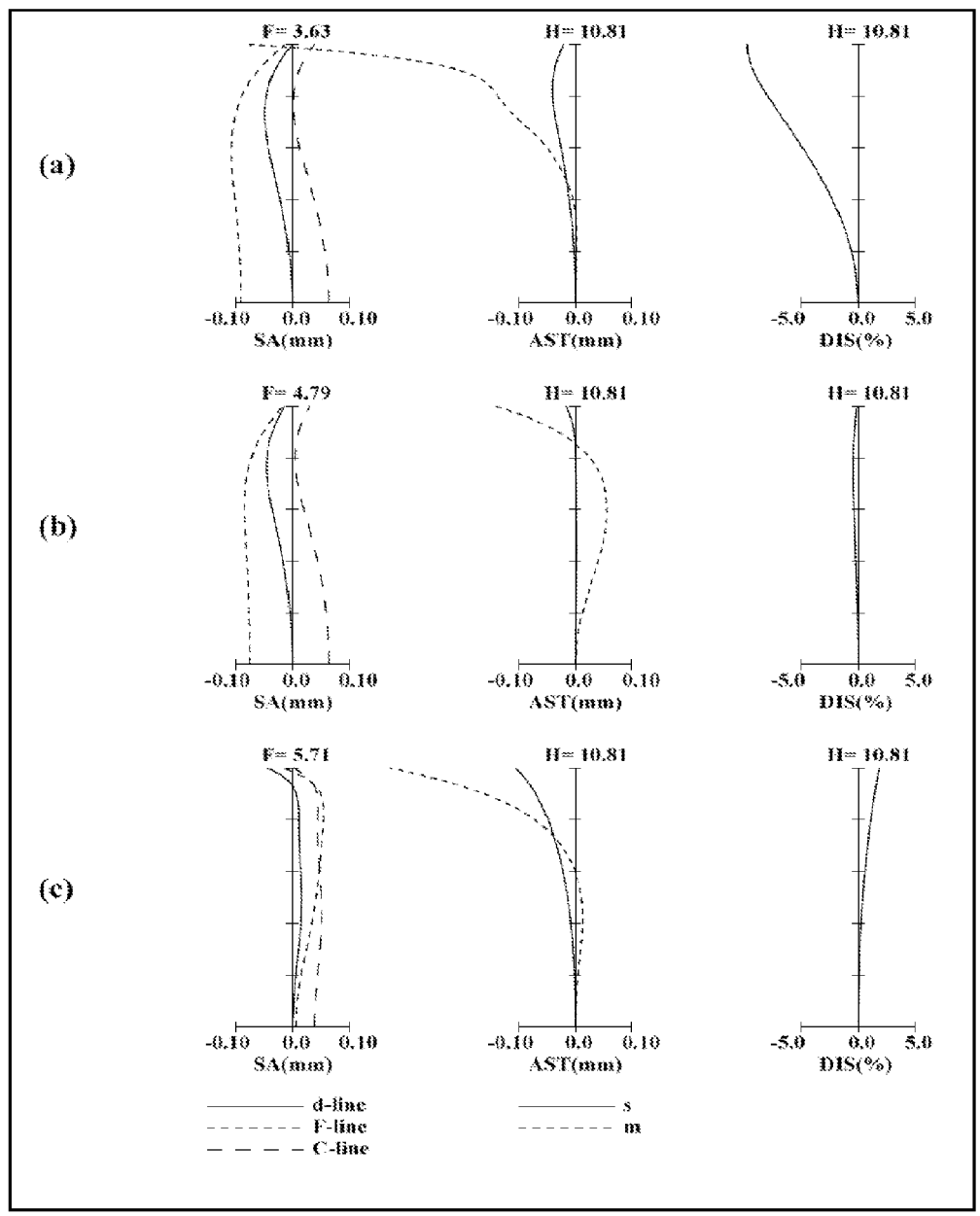
FIG. 17 is a longitudinal aberration diagram of the zoom lens system according to Example 6 in an infinity in-focus condition.
Figure 18:
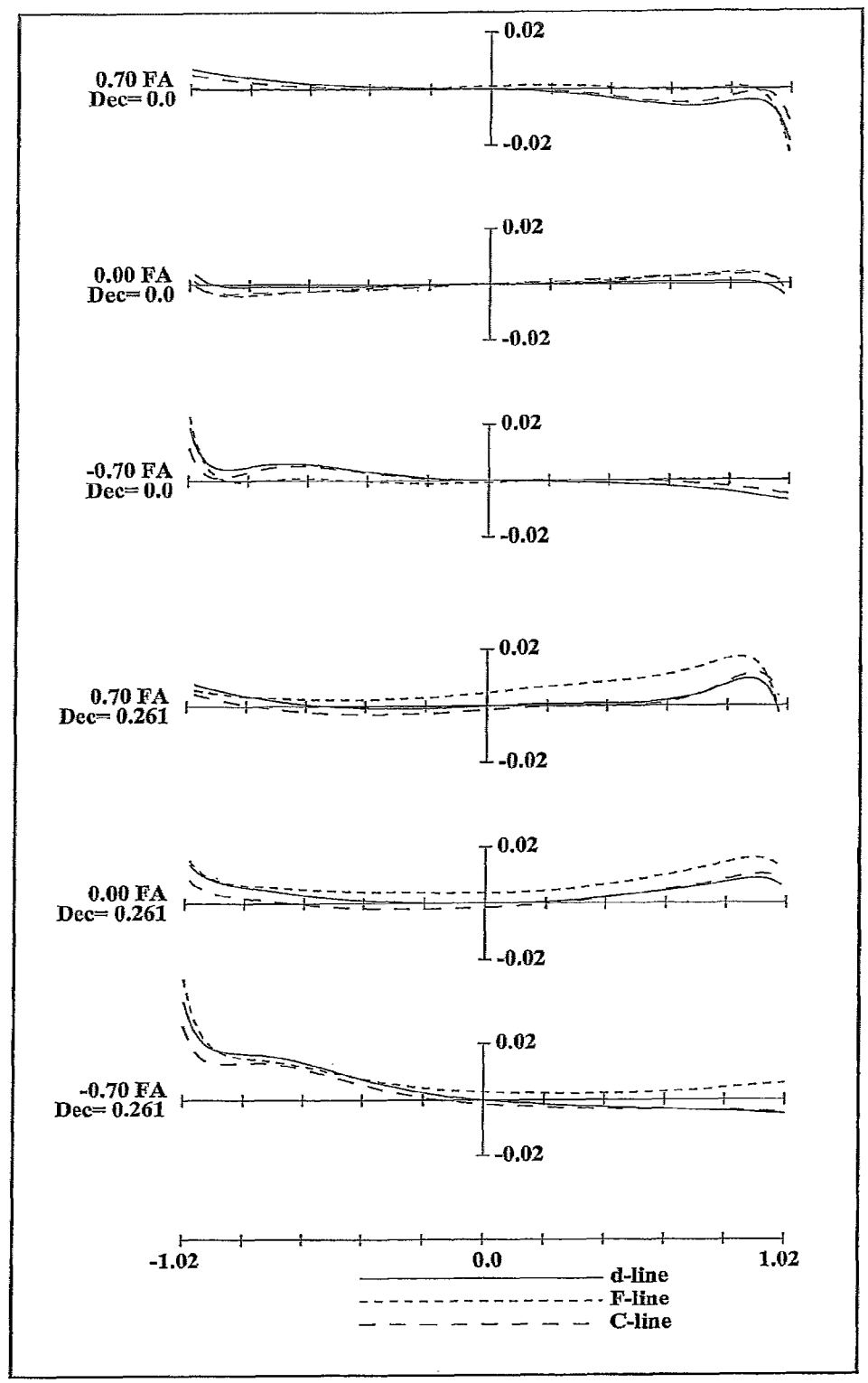
FIG. 18 is a lateral aberration diagram of the zoom lens system according to Example 6 at a telephoto limit in a basic state where image blur compensation is not performed and in an image blur compensation state.

The zoom lens system of Numerical Example 6 corresponds to Embodiment 6 (FIG. 16). The surface data, the aspheric surface data, the various data, the lens element data, the zoom lens unit data, and the zoom lens unit magnification are shown in Tables 32, 33, 34, 35, 36, and 37, respectively.

TABLE 32

(Surface data)

| Surface number | r | d | nd | vd |
|---|---|---|---|---|
| Object surface | ∞ | | | |
| 1 | 34.98850 | 1.20000 | 1.84666 | 23.8 |
| 2 | 24.95140 | 0.70000 | | |
| 3 | 25.32570 | 5.27390 | 1.58913 | 61.3 |
| 4 | -1117.09550 | Variable | | |
| 5 | 36.59270 | 0.70000 | 1.77250 | 49.6 |
| 6 | 9.88930 | 5.02000 | | |
| 7 | -49.58200 | 0.70000 | 1.77250 | 49.6 |
| 8 | 15.19140 | 0.20000 | | |
| 9 | 13.74870 | 2.70190 | 1.84666 | 23.8 |
| 10 | 289.98460 | Variable | | |
| 11 | -11.94400 | 0.70000 | 1.71300 | 53.9 |
| 12 | -20.16380 | Variable | | |
| 13 | 597.66450 | 1.50000 | 1.71300 | 53.9 |
| 14 | -44.15500 | 1.50000 | | |
| 15(Aperture) | ∞ | 0.50000 | | |
| 16 | 16.10220 | 3.18650 | 1.62299 | 58.1 |
| 17 | -14.80840 | 0.70000 | 1.80610 | 33.3 |
| 18 | 392.17240 | 8.75800 | | |
| 19* | 103.72930 | 1.56040 | 1.52996 | 55.8 |
| 20* | -107.79100 | 0.18790 | | |

TABLE 32-continued (Surface data)

| Surface number | r | d | nd | vd |
|---|---|---|---|---|
| 21 | 16.64420 | 4.00000 | 1.48749 | 70.4 |
| 22 | -12.74810 | 0.68280 | | |
| 23 | -11.13690 | 0.80000 | 1.77250 | 49.6 |
| 24 | -133.84180 | BF | | |
| Image surface | ∞ | | | |

TABLE 33

(Aspheric surface data)

| Surface No. | Parameters |
|---|---|
| 19 | K = 0.00000E+00, A4 = 3.66811E-04, A6 = 1.81869E-06, A8 = -6.63412E-09, A10 = 7.91954E-11 |
| 20 | K = 0.00000E+00, A4 = 3.72321E-04, A6 = 2.25209E-06, A8 = 4.28346E-09, A10 = 0.00000E+00 |

TABLE 34

(Various data)
Zooming ratio 3.01502

| | Wide | Middle | Telephoto |
|---|---|---|---|
| Focal length | 14.3998 | 25.0031 | 43.4155 |
| F-number | 3.62556 | 4.79091 | 5.70944 |
| View angle | 39.7851 | 23.4171 | 13.7449 |
| Image height | 10.8150 | 10.8150 | 10.8150 |
| Overall length of lens system | 79.4628 | 91.0730 | 108.4496 |
| BF | 23.46462 | 33.24994 | 46.04101 |
| d4 | 0.4000 | 7.9148 | 16.0673 |
| d10 | 3.4700 | 3.3706 | 3.6362 |
| d12 | 11.5568 | 5.9663 | 2.1337 |
| Entrance pupil position | 18.3202 | 30.4335 | 48.5024 |
| Exit pupil position | -16.7621 | -16.7621 | -16.7621 |
| Front principal point position | 27.5653 | 42.9365 | 61.9049 |
| Back principal point position | 65.0631 | 66.0699 | 65.0341 |

TABLE 35

(Lens element data)

| Unit | Initial surface No. | Focal length |
|---|---|---|
| 1 | 1 | -108.6886 |
| 2 | 3 | 42.1075 |
| 3 | 5 | -17.7454 |
| 4 | 7 | -14.9826 |
| 5 | 9 | 16.9708 |
| 6 | 11 | -42.6035 |
| 7 | 13 | 57.7242 |
| 8 | 16 | 12.8925 |
| 9 | 17 | -17.6884 |
| 10 | 19 | 100.0000 |
| 11 | 21 | 15.4997 |
| 12 | 23 | -15.7700 |

TABLE 36

(Zoom lens unit data)

| Unit | Initial surface No. | Focal length | Length of lens unit | Front principal point position | Back principal point position |
|---|---|---|---|---|---|
| 1 | 1 | 69.71664 | 7.17390 | 0.84789 | 3.32318 |
| 2 | 5 | −15.47835 | 9.32190 | 0.90398 | 2.79598 |
| 3 | 11 | −42.60347 | 0.70000 | −0.61561 | −0.33926 |
| 4 | 13 | 18.08709 | 23.37560 | 4.23950 | 8.63666 |

TABLE 37

(Zoom lens unit magnification)

| Unit | Initial surface No. | Wide | Middle | Telephoto |
|---|---|---|---|---|
| 1 | 1 | 0.00000 | 0.00000 | 0.00000 |
| 2 | 5 | −0.31535 | −0.37236 | −0.46320 |
| 3 | 11 | 0.58891 | 0.58260 | 0.56958 |
| 4 | 13 | −1.11220 | −1.65321 | −2.36041 |

Values corresponding to the individual conditions in the zoom lens systems of the respective numerical examples are shown below.

TABLE 38

(Values corresponding to the individual conditions)

| | | Example | | | |
|---|---|---|---|---|---|
| Condition | | 1 | 2 | 3 | 4 |
| (1) | $T_4/f_W$ | 1.69 | 1.63 | 1.55 | 1.65 |
| (2) | $|D_{4WT}/f_W|$ | 1.40 | 1.40 | 1.44 | 1.43 |
| (3) | $|f_W/f_3|$ | 0.27 | 0.44 | 0.41 | 0.37 |
| (4) | $|D_1/f_W|$ | 1.78 | 1.76 | 2.01 | 2.01 |
| (5) | $(D_{3WT} - D_{4WT})/f_W$ | 0.71 | 0.68 | 0.75 | 0.72 |
| (6) | $(D_{3WN} - D_{4WN})/f_W$ | 0.40 | 0.39 | 0.46 | 0.44 |
| | | | | | 0.19 (L7) |
| (7) | $|f_W/f_P|$ | 0.14 | 0.01 | 0.41 | 0.14 (L10) |
| (8) | $BF_W/f_W$ | 1.67 | 1.56 | 1.63 | 1.58 |
| (9) | $nd_1$ | 1.59 | 1.59 | 1.59 | 1.59 |
| (10) | $vd_1$ | 61 | 61 | 61 | 61 |

| | | Example | |
|---|---|---|---|
| Condition | | 5 | 6 |
| (1) | $T_4/f_W$ | 1.90 | 1.62 |
| (2) | $|D_{4WT}/f_W|$ | 1.20 | 1.57 |
| (3) | $|f_W/f_3|$ | 0.49 | 0.34 |
| (4) | $|D_1/f_W|$ | 2.07 | 2.01 |
| (5) | $(D_{3WT} - D_{4WT})/f_W$ | 0.77 | 0.65 |
| (6) | $(D_{3WN} - D_{4WN})/f_W$ | 0.50 | 0.39 |
| (7) | $|f_W/f_P|$ | 0.01 | 0.14 |
| (8) | $BF_W/f_W$ | 1.18 | 1.63 |
| (9) | $nd_1$ | 1.59 | 1.59 |
| (10) | $vd_1$ | 61 | 61 |

INDUSTRIAL APPLICABILITY

A zoom lens system according to the present invention is applicable to a digital still camera, a digital video camera, a camera of a mobile telephone, a camera of a PDA (Personal Digital Assistance), a monitor camera in a monitor system, a Web camera, an in-vehicle camera, and the like. In particular, the zoom lens system is suitable for an imaging optical system such as a digital still camera system or a digital video camera system, which requires high image quality

DESCRIPTION OF THE REFERENCE CHARACTERS

100 interchangeable-lens type digital camera system
101 camera body
102 image sensor
104 camera mount
201 interchangeable lens apparatus
202 zoom lens system

The invention claimed is:
1. A zoom lens system comprising:
in order from an object side to an image side,
a first lens unit having positive optical power and composed of not more than two lens elements;
a second lens unit having negative optical power;
a third lens unit having negative optical power; and
a fourth lens unit having positive optical power, wherein
in zooming from a wide-angle limit to a telephoto limit, the fourth lens unit moves along an optical axis, and
the following conditions are satisfied:

$$0.2 < |f_W/f_F| < 0.6 \tag{3}$$

$$1.50 < nd_1 < 1.72 \tag{9}$$

$$50 < vd_1 < 75 \tag{10}$$

where
$f_W$ is a focal length of the zoom lens system at a wide-angle limit,
$f_F$ is a focal length of the third lens unit,
$nd_1$ is a refractive index to the d line of a positive lens element constituting the first lens unit, and
$vd_1$ is an Abbe number of a positive lens element constituting the first lens unit.

2. The zoom lens system according to claim 1, wherein the first lens unit moves along the optical axis in zooming.

3. The zoom lens system according to claim 1, wherein the third lens unit moves along the optical axis in focusing from an infinity in-focus condition to a close-object in-focus condition.

4. The zoom lens system according to claim 1, wherein a lens unit, which moves along the optical axis in focusing from an infinity in-focus condition to a close-object in-focus condition, is composed of a single lens element.

5. The zoom lens system according to claim 1, wherein when compensating an image blur caused by vibration of the zoom lens system, a sub-lens unit which is composed of a part of a plurality of lens elements constituting the fourth lens unit moves in a direction perpendicular to the optical axis.

6. The zoom lens system according to claim 1, wherein a sub-lens unit, which moves in a direction perpendicular to the optical axis when compensating an image blur caused by vibration of the zoom lens system, is composed of a single lens element.

7. The zoom lens system according to claim 1, wherein the first lens unit is composed of two lens elements.

8. The zoom lens system according to claim 1, wherein the first lens unit is composed of a single cemented lens element composed of two lens elements cemented with each other.

9. The zoom lens system according to claim 1, which satisfies the following condition:

$$0.71 < |D_{4WT}/f_W| < 2.5 \tag{2}$$

where $D_{4WT}$ is an amount of movement of the fourth lens unit in zooming from a wide-angle limit to a telephoto limit, and $f_W$ is a focal length of the zoom lens system at a wide-angle limit.

10. The zoom lens system according to claim 1, which satisfies the following condition:

$$0.7 < BF_W/f_W < 3.0 \tag{8}$$

where $BF_W$ is a back focus of the zoom lens system at a wide-angle limit, and $f_W$ is a focal length of the zoom lens system at a wide-angle limit.

11. An interchangeable lens apparatus comprising:
a zoom lens system according to claim 1; and
a lens mount section which is connectable to a camera body including an image sensor for receiving an optical image formed by the zoom lens system and converting the optical image into an electric image signal.

12. A camera system comprising:
an interchangeable lens apparatus including a zoom lens system according to claim 1; and
a camera body which is detachably connected to the interchangeable lens apparatus via a camera mount section, and includes an image sensor for receiving an optical image formed by the zoom lens system and converting the optical image into an electric image signal.

13. A zoom lens system consisting of:
in order from an object side to an image side,
a first lens unit having positive optical power and composed of not more than two lens elements;
a second lens unit having negative optical power;
a third lens unit having negative optical power; and
a fourth lens unit having positive optical power, wherein
in zooming from a wide-angle limit to a telephoto limit, the fourth lens unit moves along an optical axis, and
the following conditions are satisfied:

$$0.77 < |D_1/f_W| < 3.5 \tag{4}$$

$$1.50 < nd_1 < 1.72 \tag{9}$$

$$50 < vd_1 < 75 \tag{10}$$

where $D_1$ is an amount of movement of the first lens unit in zooming from a wide-angle limit to a telephoto limit, $f_W$ is a focal length of the zoom lens system at a wide-angle limit, $nd_1$ is a refractive index to the d line of a positive lens element constituting the first lens unit, and $vd_1$ is an Abbe number of a positive lens element constituting the firs lens unit.

* * * * *